(12) United States Patent
Mochizuki et al.

(10) Patent No.: US 12,071,048 B2
(45) Date of Patent: Aug. 27, 2024

(54) SEAT-ROTATING DEVICE

(71) Applicant: TS TECH CO., LTD., Saitama (JP)

(72) Inventors: Haruki Mochizuki, Tochigi (JP); Takeshi Akutsu, Tochigi (JP); Takuji Kaneda, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 541 days.

(21) Appl. No.: 17/296,385

(22) PCT Filed: Nov. 25, 2019

(86) PCT No.: PCT/JP2019/045930
§ 371 (c)(1),
(2) Date: May 24, 2021

(87) PCT Pub. No.: WO2020/110984
PCT Pub. Date: Jun. 4, 2020

(65) Prior Publication Data
US 2022/0032823 A1 Feb. 3, 2022

(30) Foreign Application Priority Data

Nov. 26, 2018 (JP) ................................ 2018-220691
Jan. 21, 2019 (JP) ................................ 2019-008028
(Continued)

(51) Int. Cl.
*B60N 2/14* (2006.01)
*B60N 2/06* (2006.01)
(52) U.S. Cl.
CPC ................ *B60N 2/146* (2013.01); *B60N 2/06* (2013.01)
(58) Field of Classification Search
CPC . B60N 2/146; B60N 2/06; B60N 2/14; B60N 2/075
See application file for complete search history.

(56) References Cited

U.S. PATENT DOCUMENTS 3,858,834 A * 1/1975 Eimen ...................... A47C 3/18
297/344.22
6,021,989 A * 2/2000 Morita .................. B60N 2/146
297/344.26
(Continued)

FOREIGN PATENT DOCUMENTS

JP   H0867181 A    3/1996
JP   H09286263 A   11/1997
(Continued)

OTHER PUBLICATIONS he International Search Report and Written Opinion Corresponding to Application No. PCT/JP2019/045930, Jan. 28, 2020. (4 pages).
(Continued)

*Primary Examiner* — Amy R Weisberg
*Assistant Examiner* — Sara Laghlam
(74) *Attorney, Agent, or Firm* — Dority & Manning, P.A.

(57) ABSTRACT

In a seat-rotating device that enables a seat to be rotated on a base member, a rattle-suppressing member operating in association with a lock member, which switches between the locked state in which rotation of an annular rotating member supporting a seat frame is prevented and release of the locked state, is in close contact with both a support member and the annular rotating member when the lock member is at the locked position, and a gap is created between the support member and the annular rotating member when the lock member attains the lock release position. Accordingly, it is possible to prevent the seat from rattling when it is in a stationary state and to facilitate rotation by releasing the rattle-preventing state when the seat is rotating.

27 Claims, 29 Drawing Sheets

(30) Foreign Application Priority Data

| Jan. 25, 2019 | (JP) | 2019-011615 |
| Feb. 18, 2019 | (JP) | 2019-026600 |
| Mar. 13, 2019 | (JP) | 2019-046309 |

(56) References Cited

U.S. PATENT DOCUMENTS

| 6,736,452 | B2 | 5/2004 | Aoki et al. | |
| 8,220,856 | B2* | 7/2012 | Horiguchi | B60N 2/0224 |
| | | | | 296/65.01 |
| 2003/0102699 | A1* | 6/2003 | Aoki | B60H 1/00285 |
| | | | | 297/180.13 |
| 2016/0194035 | A1 | 7/2016 | Lu et al. | |
| 2022/0227264 | A1* | 7/2022 | Mochizuki | B60N 2/12 |

FOREIGN PATENT DOCUMENTS

| JP | H 10-100752 | | 4/1998 |
| JP | H1086713 A | | 4/1998 |
| JP | 11222059 A | * | 8/1999 |
| JP | H11222060 A | | 8/1999 |
| JP | 2002-160556 | | 6/2002 |
| JP | 2002160556 A | * | 6/2002 |
| JP | 2003165325 A | | 6/2003 |
| JP | 2010-173491 | | 8/2010 |
| JP | 2018-95152 | | 6/2018 |
| JP | 2020090267 A | | 6/2020 |

OTHER PUBLICATIONS

Japanese Office Action (w/ English translation) for corresponding Japanese Application No. 2019-011615, dated Mar. 1, 2023, 12 pages.

Japanese Office Action (w/ English translation) for corresponding Japanese Application No. 2019-046309, dated Mar. 1, 2023, 6 pages.

Extended European Search Report for application No. 19890039.1, mailed on Jun. 27, 2022, 5 pages.

Japanese Notice of Reasons for Refusal (w/ English translation) for corresponding Application No. 2023-032550, dated Jun. 18, 2024, 12 pages.

* cited by examiner

FIG.6
(a)
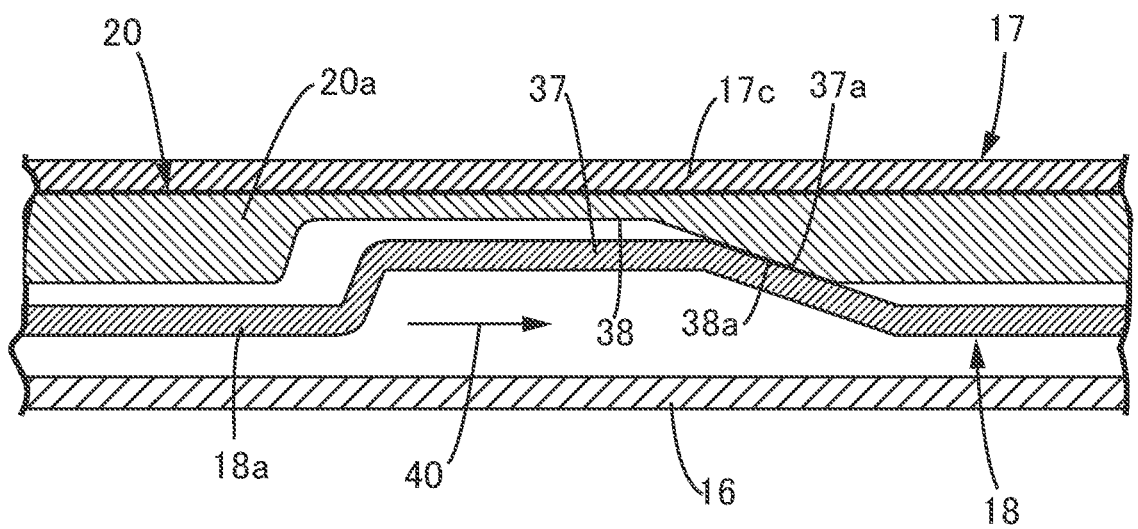
(b)
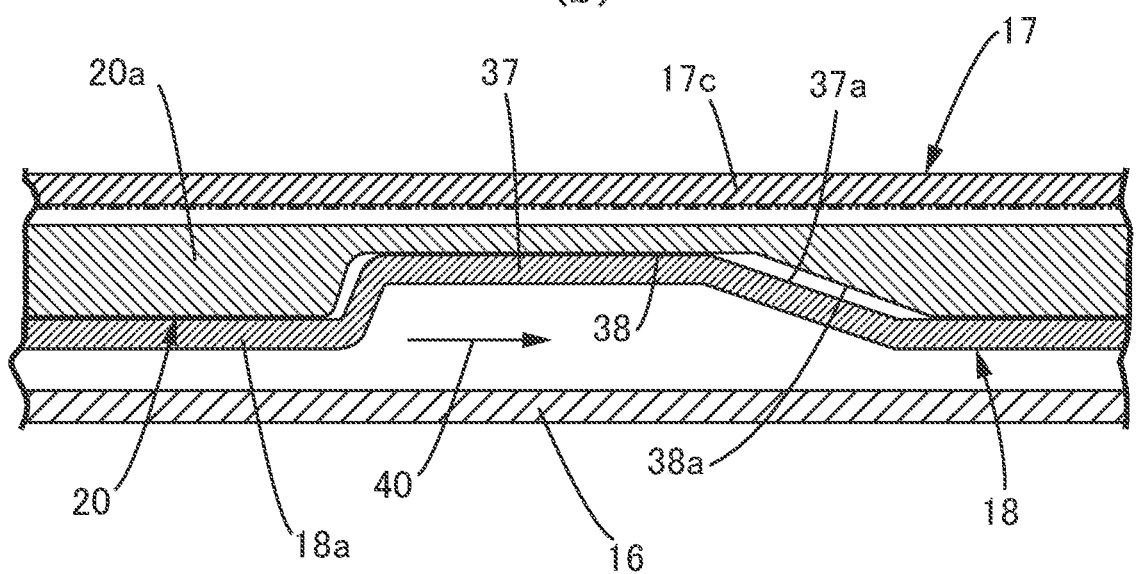

FIG.23
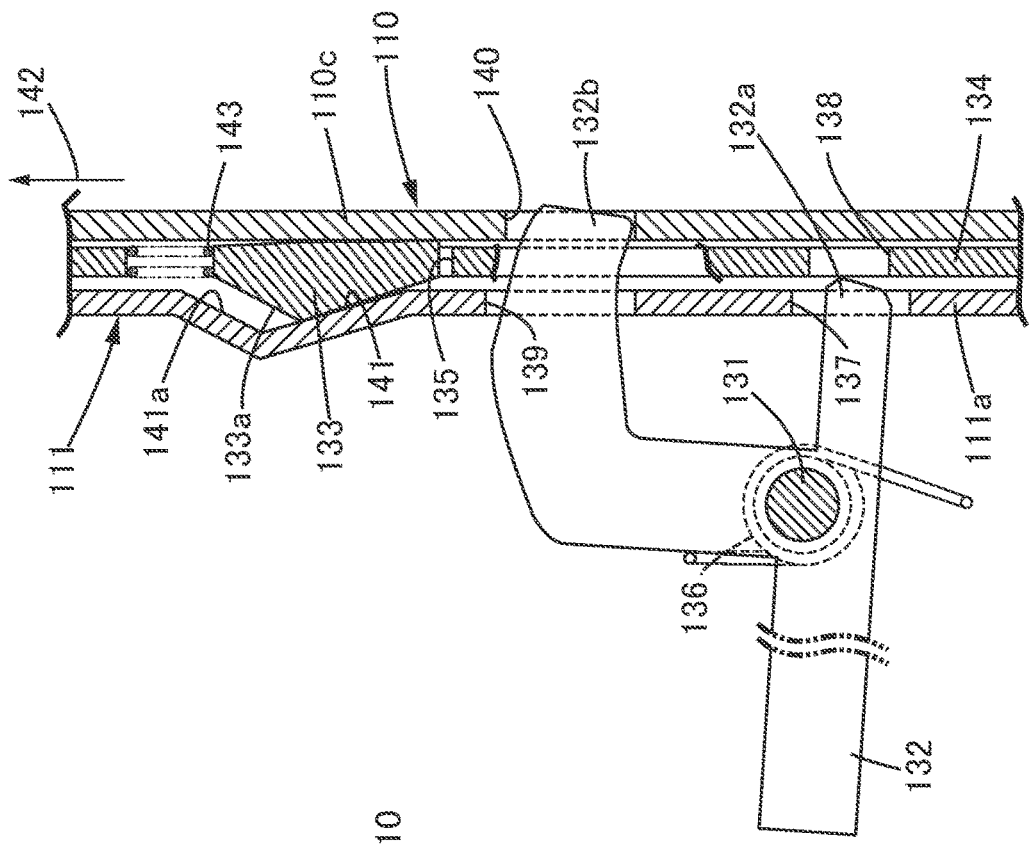
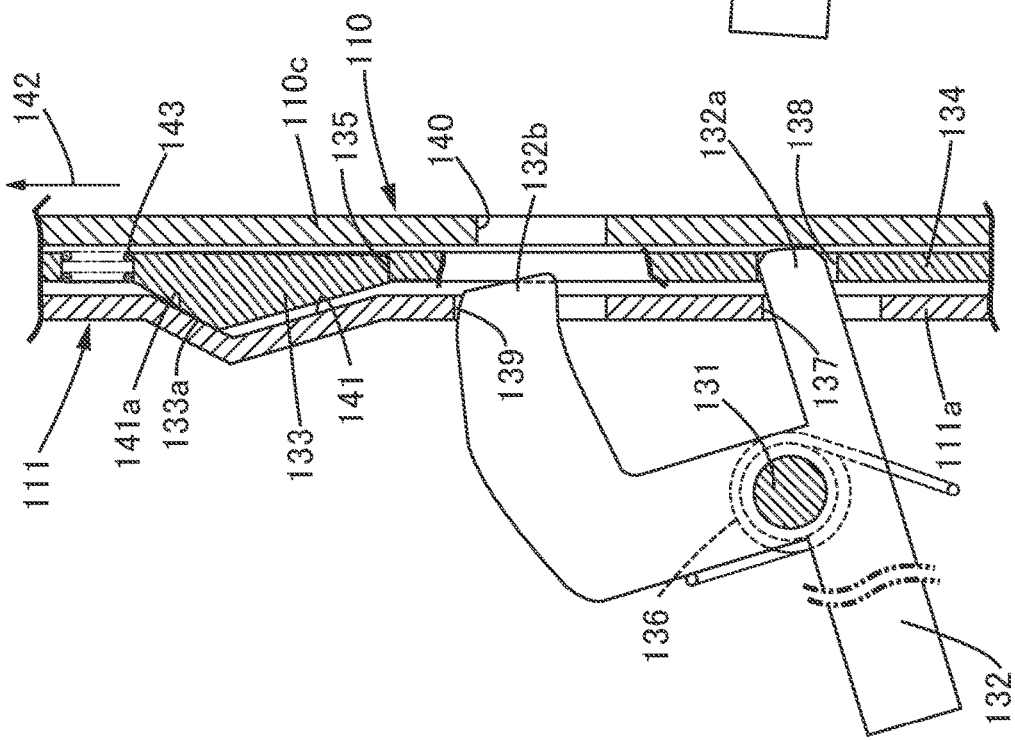

SEAT-ROTATING DEVICE

CROSS REFERENCE TO RELATED APPLICATIONS

This application is the U.S. National Stage entry of International Application No. PCT/JP2019/045930 filed under the Patent Cooperation Treaty having a filing date of Nov. 25, 2019, which claims priority to Japanese Patent Application No. 2018-220691 having a filing date of Nov. 26, 2018, Japanese Patent Application No. 2019-008028 having a filing date of Jan. 21, 2019, Japanese Patent Application No. 2019-011615 having a filing date of Jan. 25, 2019, Japanese Patent Application No. 2019-026600 having a filing date of Feb. 18, 2019, and Japanese Patent Application No. 2019-046309 having a filing date of Mar. 13, 2019, all of which are incorporated herein by reference.

TECHNICAL FIELD

The present invention relates to a seat-rotating device that enables a seat to be rotated on a base member.

BACKGROUND ART

A seat-rotating device that rotatably supports a vehicular seat is known from Patent Document 1.

RELATED ART DOCUMENTS

Patent Documents

Patent Document 1: Japanese Patent Application Laid-open No. 2010-173491

SUMMARY OF THE INVENTION

Problems to be Solved by the Invention

In such a seat-rotating device, it is desirable that no rattling occurs in a locked state in which the seat is stationary; in the seat-rotating device disclosed by Patent Document 1, a rattle-preventing function operates even when the seat is rotating, and the force required for rotating the seat becomes larger than necessary.

The present invention has been accomplished in light of such circumstances, and it is an object thereof to provide a seat-rotating device that prevents rattling when a seat is in a stationary state and facilitates rotation of the seat at the time of rotation by releasing the rattle-preventing state.

Means for Solving the Problems

In order to attain the above object, according to a first aspect of the present invention, there is provided a seat-rotating device that enables a seat to be rotated on a base member, characterized in that the device comprises a support member that is fixed to the base member, an annular rotating member that supports a seat frame, is disposed on either an outside or an inside of the support member, and is rotatably supported on the base member, a lock member that can operate between a locked position in which the lock member engages with the support member so as to prevent rotation of the annular rotating member and a lock release position in which the engagement with the support member is released so as to allow rotation of the annular rotating member, and a rattle-suppressing member that is disposed between the support member and the annular rotating member and is operatively linked to the lock member so that when the lock member is at the locked position the rattle-suppressing member is in close contact with both the support member and the annular rotating member and when the lock member is at the lock release position a gap is created between the rattle-suppressing member and the support member and annular rotating member.

Further, according to a second aspect of the present invention, in addition to the first aspect, the rattle-suppressing member is formed into an annular shape so as to be capable of rotating around an axis that is coaxial with the annular rotating member and is disposed between the support member and the annular rotating member, and a link arm portion linked to the rattle-suppressing member is formed integrally with the lock member, which is pivotably supported on the annular rotating member.

According to a third aspect of the present invention, in addition to the second aspect, an engagement arm portion is formed integrally with the lock member at a position separated from the link arm portion in a peripheral direction of the annular rotating member, the engagement arm portion engaging with the annular rotating member and the support member at the locked position and releasing the engagement with the support member at the lock release position.

According to a fourth aspect of the present invention, in addition to any one of the first to third aspects, formed on one of the rattle-suppressing member and the annular rotating member is a wedge-shaped projecting part having a projecting part-side inclined face whose height gradually decreases in going in a direction of movement of the rattle-suppressing member in response to operation of the lock member from the lock release position toward the locked position side, and formed in the other of the rattle-suppressing member and the annular rotating member is a recess part having a recess part-side inclined face that opposes the projecting part-side inclined face and housing part of the projecting part, the projecting part being capable of being fitted into the recess part.

According to a fifth aspect of the present invention, in addition to the fourth aspect, the seat-rotating device comprises an urging member that urges the rattle-suppressing member toward the side on which the projecting part is fitted into the recess part.

According to a sixth aspect of the present invention, in addition to the third aspect, a through hole having the engagement arm portion inserted therethrough at the locked position is formed in each of the annular rotating member and the support member, and a width of the through hole along the peripheral direction of the annular rotating member is set so as to create a gap along the peripheral direction between the through hole and the engagement arm portion inserted through the through hole.

According to a seventh aspect of the present invention, in addition to the fourth aspect, the projecting part and the recess part are disposed at a plurality of locations spaced in the peripheral direction of the annular rotating member.

According to an eighth aspect of the present invention, in addition to any one of the first to seventh aspects, the rattle-suppressing member is disposed between the support member and the annular rotating member so that the rattle-suppressing member can be in close contact with both the support member and the annular rotating member in a radial direction and in an axial direction of the annular rotating member when the lock member is at the locked position.

Moreover, according to a ninth aspect of the present invention, in addition to any one of the first to eighth aspects, the seat is a vehicular seat having a seat cushion and a seat back that is disposed above the seat cushion, and is slidably supported by a pair of slide rails provided on a vehicular floor face.

Effects of the Invention

In accordance with the first aspect of the present invention, since the rattle-suppressing member operating in association with the lock member, which switches between the locked state in which rotation of the annular rotating member supporting the seat frame is prevented and release of the locked state, is in close contact with both the support member and annular rotating member when the lock member is at the locked position, and a gap is created between the support member and the annular rotating member when the lock member attains the lock release position, it is possible to prevent the seat from rattling when it is in a stationary state and to facilitate rotation when the seat is rotating.

Furthermore, in accordance with the second aspect of the present invention, since the rattle-suppressing member, which is annular, is disposed between the support member and the annular rotating member, and the link arm portion linked to the rattle-suppressing member is formed integrally with the lock member pivotably supported on the annular rotating member, it is possible to operate the rattle-suppressing member in association with operation of the lock member with a simple structure.

In accordance with the third aspect of the present invention, since the engagement arm portion, which engages with the annular rotating member and the support member at the locked position, is formed integrally with the lock member at a position separated from the link arm portion in the peripheral direction of the annular rotating member, a mechanism for locking the annular rotating member and a mechanism for operating the rattle-suppressing member in association with the lock member can be combined in a compact manner while avoiding an increase in the size in a direction along the rotational axis of the annular rotating member.

In accordance with the fourth aspect of the present invention, since the triangular wedge-shaped projecting part is formed on one of the rattle-suppressing member and the annular rotating member, the recess part housing part of the projecting part is formed in the other of the rattle-suppressing member and the annular rotating member so that the projecting part can be fitted into the recess part, and the projecting part and the recess part have inclined faces opposing each other so that their height gradually decreases in going in the direction of movement of the rattle-suppressing member in response to operation of the lock member from the lock release position toward the locked position side, it is possible to make it easy to release the fitted state between the projecting part and the recess part when the lock member operates from the locked position to the lock release position.

In accordance with the fifth aspect of the present invention, since the rattle-suppressing member is urged to the side on which the projecting part is fitted into the recess part, it is possible to strongly maintain fitting of the projecting part into the recess part in the locked state, thereby reliably suppressing the occurrence of rattling.

In accordance with the sixth aspect of the present invention, since the through holes are formed in the annular rotating member and the support member respectively so that the engagement arm portion can be inserted therethrough, and the engagement arm portion is inserted through the through holes so as to create a gap between itself and the through holes along the peripheral direction of the annular rotating member, rattling is suppressed in the locked state due to the projecting part being fitted into the recess part, thus preventing rattling from being generated between the engagement arm portion and the annular rotating member and support member, enabling the dimensional tolerance between the engagement arm portion and the through holes to be set loosely, facilitating production and assembly, and contributing to a reduction in the cost.

In accordance with the seventh aspect of the present invention, since the projecting part is fitted into the recess part at a plurality of locations spaced in the peripheral direction of the annular rotating member, it is possible to disperse the fitting load in the peripheral direction while avoiding it being concentrated at one position.

In accordance with the eighth aspect of the present invention, since the rattle-suppressing member is in close contact with both the support member and the annular rotating member in the radial direction and the axial direction of the annular rotating member at the locked position, it is possible to suppress rattling of the annular rotating member in the radial direction, in the peripheral direction, and in the axial direction.

Moreover, in accordance with the ninth aspect of the present invention, since the seat is a vehicular seat, it is possible to apply effectively the present invention as a vehicular seat-rotating device.

BRIEF DESCRIPTION OF DRAWINGS

FIG. 6 is a sectional view along line 6-6 in FIG. 3 showing a comparison of (a) a state in which the lock member is at the locked position and (b) a state in which it is at the lock release position. (first embodiment)

FIG. 23 is a sectional view along line 23-23 in FIG. 20. (sixth embodiment)

EXPLANATION OF REFERENCE NUMERALS AND SYMBOLS

Figure 1:
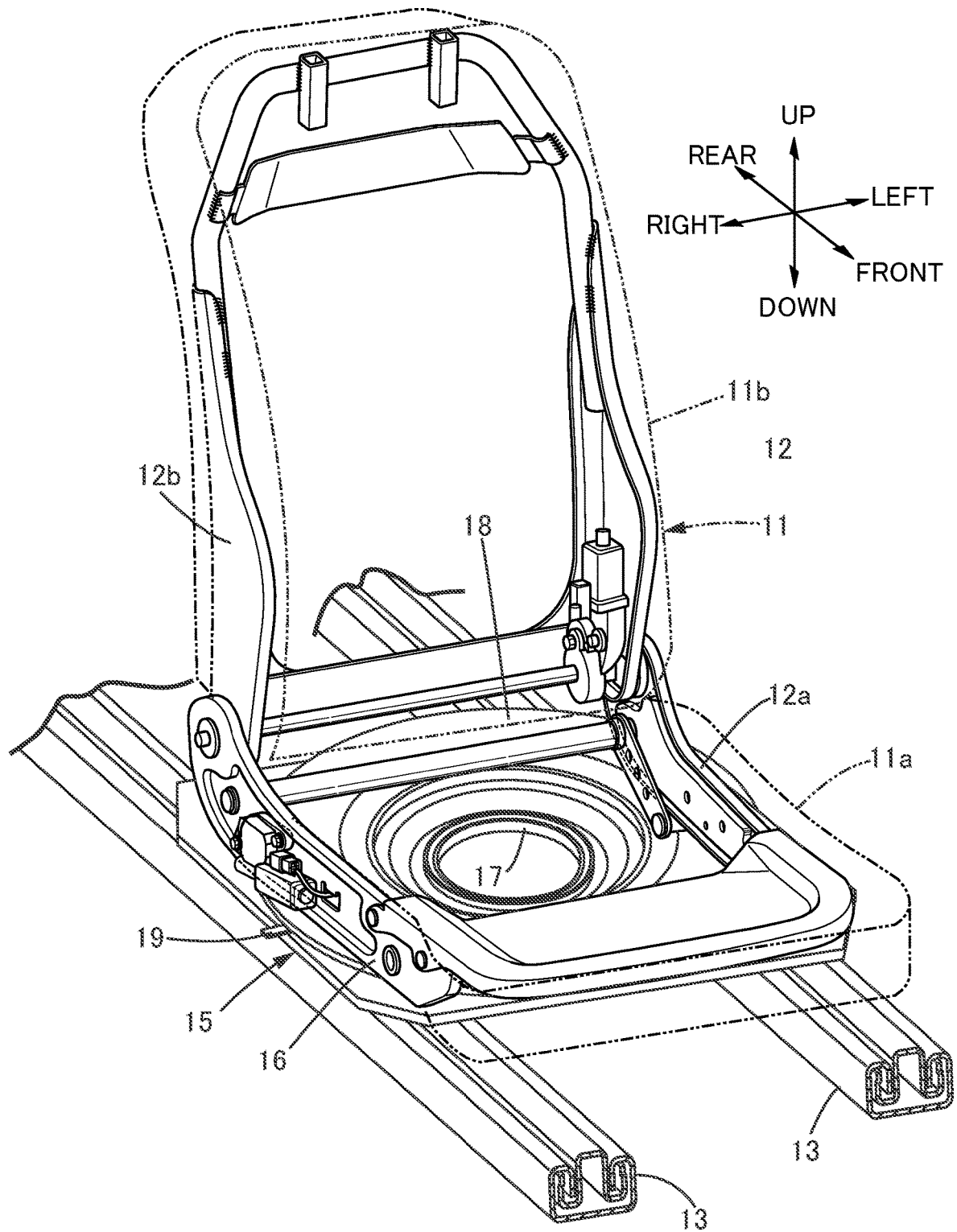
FIG. 1 is a perspective view showing a state in which a seat frame of a first embodiment is present on a seat-rotating device. (first embodiment)

11 Seat
11a Seat cushion
11b Seat back
12 Seat frame
13 Slide rail
15, 45, 55, 109 Seat-rotating device
16, 46, 56, 108 Base member
17, 47, 57, 110 Support member
18, 48, 58, 111 Annular rotating member
19, 59, 132 Lock member
20, 60, 82, 90, 133 Rattle-suppressing member
19a, 132a Link arm portion
19b, 132b Engagement arm portion
33, 34, 137, 138 Through hole
35, 37 Projecting part
35a, 37a Projection part-side inclined face
36, 38 Recess part
36a, 38a Recess part-side inclined face
40 Direction of movement
41 Urging member
d1, d2 Gap
W1, W2 Width of through hole

MODES FOR CARRYING OUT THE INVENTION

Embodiments of the present invention are explained below by reference to the attached drawings. In the explanation below, 'front/rear', 'left/right', and 'up/down' are directions as viewed by an occupant seated on a seat in a state when the seat is in an attitude so that the seated occupant faces forward.

First Embodiment

A first embodiment of the present invention is explained by reference to FIG. 1 to FIG. 6. First, in FIG. 1, a seat 11 is a vehicular seat installed in a vehicle, and a seat frame 12 thereof is disposed on a first base member 16 that can slide in the vehicle fore-and-aft direction via a pair of left and right slide rails 13 provided on a vehicular floor face. The seat frame 12 includes a seat cushion frame 28 disposed above the first base member 16 so as to support a seat cushion 11a of the seat 11, and a seat back frame 29 linked to a rear part of the seat cushion frame 28 so as to support a seat back 11b disposed above the seat cushion 11a.

Figure 2:
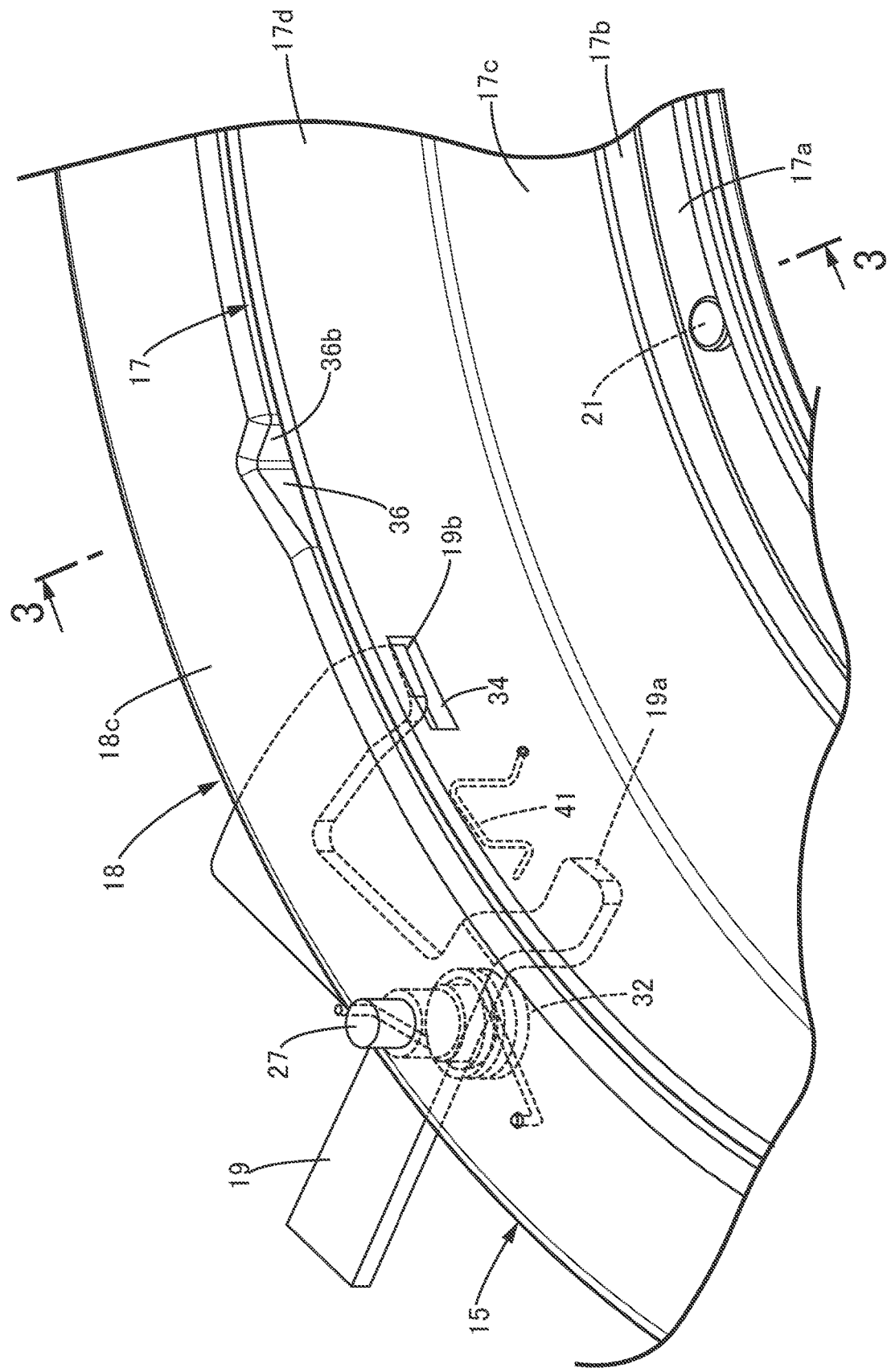
FIG. 2 is a perspective view showing part of the seat-rotating device. (first embodiment)
Figure 3:
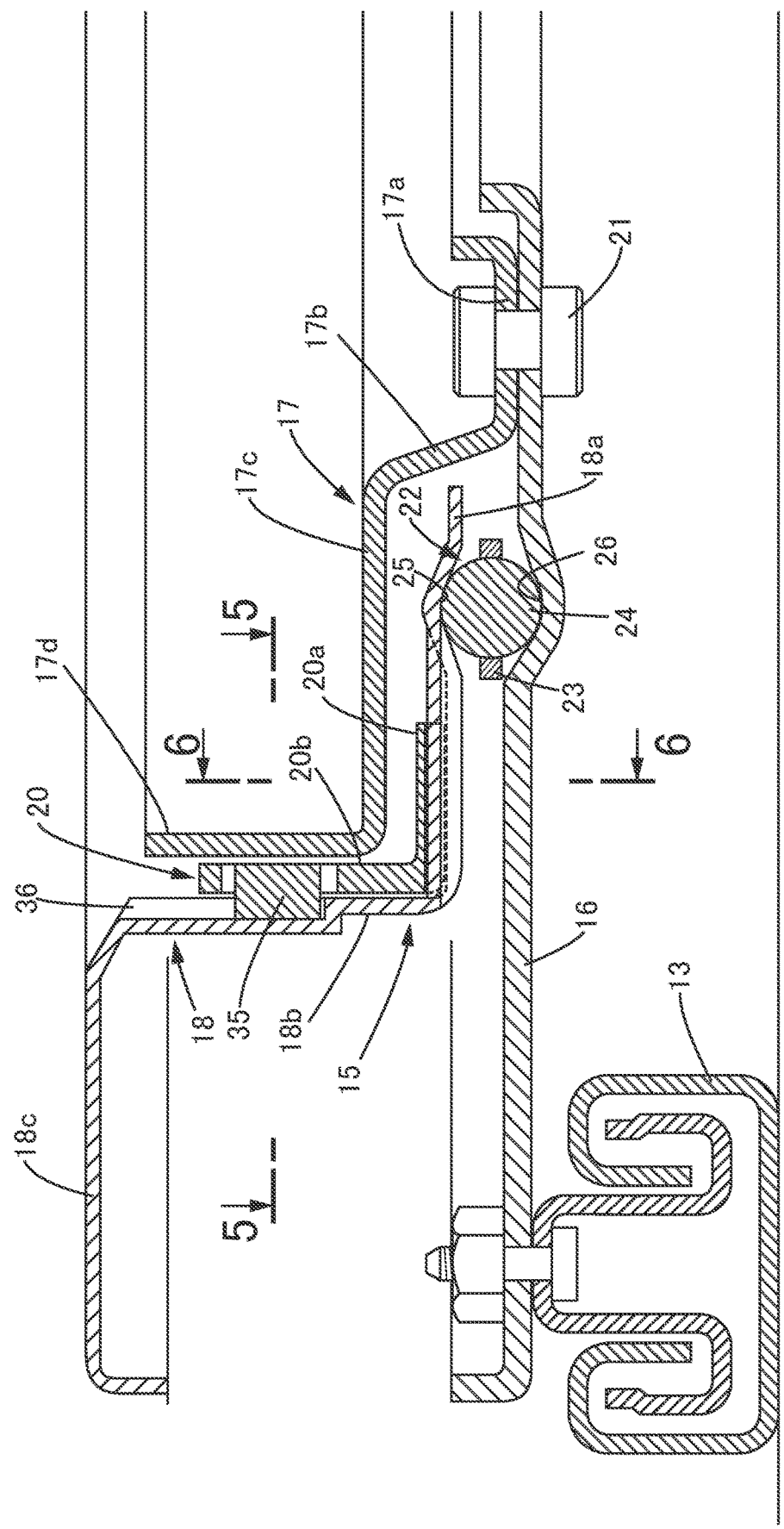
FIG. 3 is a sectional view along line 3-3 in FIG. 2. (first embodiment)
Figure 4:
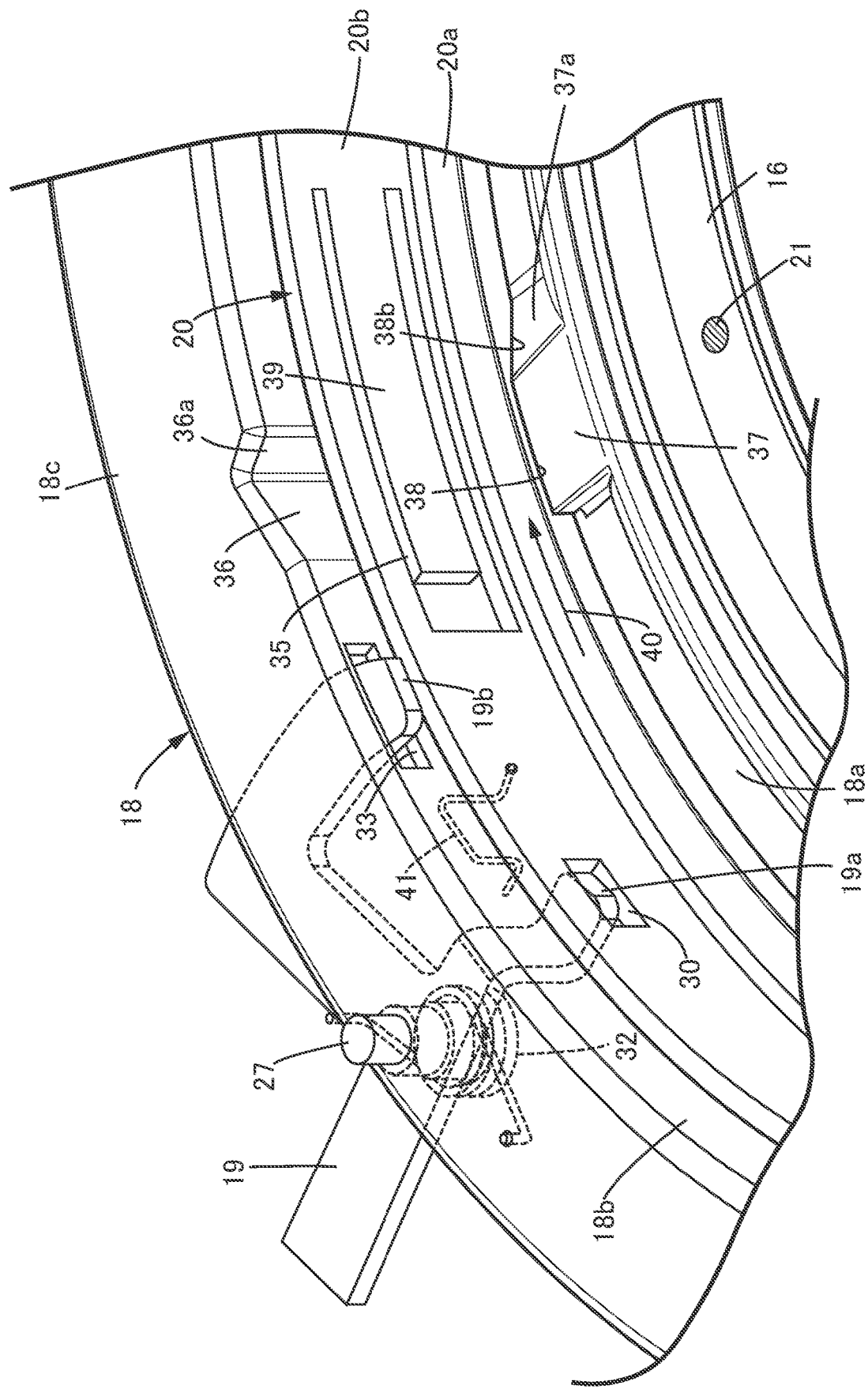
FIG. 4 is a perspective view showing FIG. 2 after omitting a support member therefrom. (first embodiment)

Referring in addition to FIG. 2 to FIG. 4, the seat frame 12 is supported on the first base member 16, which is supported by the slide rail 13 so that it can slide in the vehicle fore-and-aft direction, the seat frame 12 being capable of rotating around a vertical axis via a first seat-rotating device 15 in accordance with the present invention. The first seat-rotating device 15 includes a first support member 17 that is fixed to the first base member 16, a first annular rotating member 18 that supports the seat frame 12, is disposed on either the outside or the inside of the first support member 17 (on the outside in this embodiment), and is rotatably supported on the first base member 16, a first lock member 19 that is supported on the first annular rotating member 18 so as to switch between a locked state and release of the locked state of the first annular rotating member 18 with respect to the first support member 17, and a first rattle-suppressing member 20 formed into an annular shape disposed between the first support member 17 and the first annular rotating member 18 so as to operate in association with operation of the first lock member 19.

The first support member 17 integrally has an annular first bottom wall portion 17a that abuts against the first base member 16, a tapered first side wall portion 17b that is formed so as to have a diameter that increases slightly in going upward and rises upward from the outer periphery of the first bottom wall portion 17a, an annular first flat wall portion 17c that protrudes radially outward from an upper end part of the first side wall portion 17b, and a cylindrical second side wall portion 17d that rises upward from the outer periphery of the first flat wall portion 17c. A plurality of locations in the peripheral direction of the first bottom wall portion 17a are joined to the first base member 16 by means of a rivet 21.

The first annular rotating member 18 integrally has a second bottom wall portion 18a that is formed into an annular shape beneath the first flat wall portion 17c of the first support member 17, a cylindrical third side wall portion 18b that rises upward from the outer periphery of the second bottom wall portion 18a so as to be disposed radially outward of the second side wall portion 17d of the first support member 17, and a first collar portion 18c that protrudes outward from an upper end part of the third side wall portion 18b. The third side wall portion 18b is formed so that the upper end part thereof is present higher than an upper end part of the second side wall portion 17d.

A bearing 22 is disposed between the second bottom wall portion 18a of the first annular rotating member 18 and the first base member 16, the bearing 22 being formed by retaining a ball 24 at a plurality of locations in the peripheral direction of an annular retainer 23, and ball-retaining recess parts 25, 26 rotatably housing and retaining part of the ball 24 are formed in the second bottom wall portion 18a and the first base member 16.

The first rattle-suppressing member 20 is formed into an annular shape and is disposed between the first support member 17 and the first annular rotating member 18 so that it can rotate around an axis coaxial with the first annular rotating member 18, and integrally has an annular third bottom wall portion 20a that is disposed between the first flat wall portion 17c of the first support member 17 and the second bottom wall portion 18a of the first annular rotating member 18, and a cylindrical fourth side wall portion 20b that rises upward from the outer periphery of the third bottom wall portion 20a so as to be disposed between the second side wall portion 17d of the first support member 17 and the third side wall portion 18b of the first annular rotating member 18, its cross-sectional shape being substantially L-shaped. Moreover, the height of the fourth side wall portion 20b is set so that an upper end part of the fourth side wall portion 20b is lower than the upper end part of the second side wall portion 17d of the first support member 17 and the upper end part of the third side wall portion 18b of the first annular rotating member 18.

Figure 5:
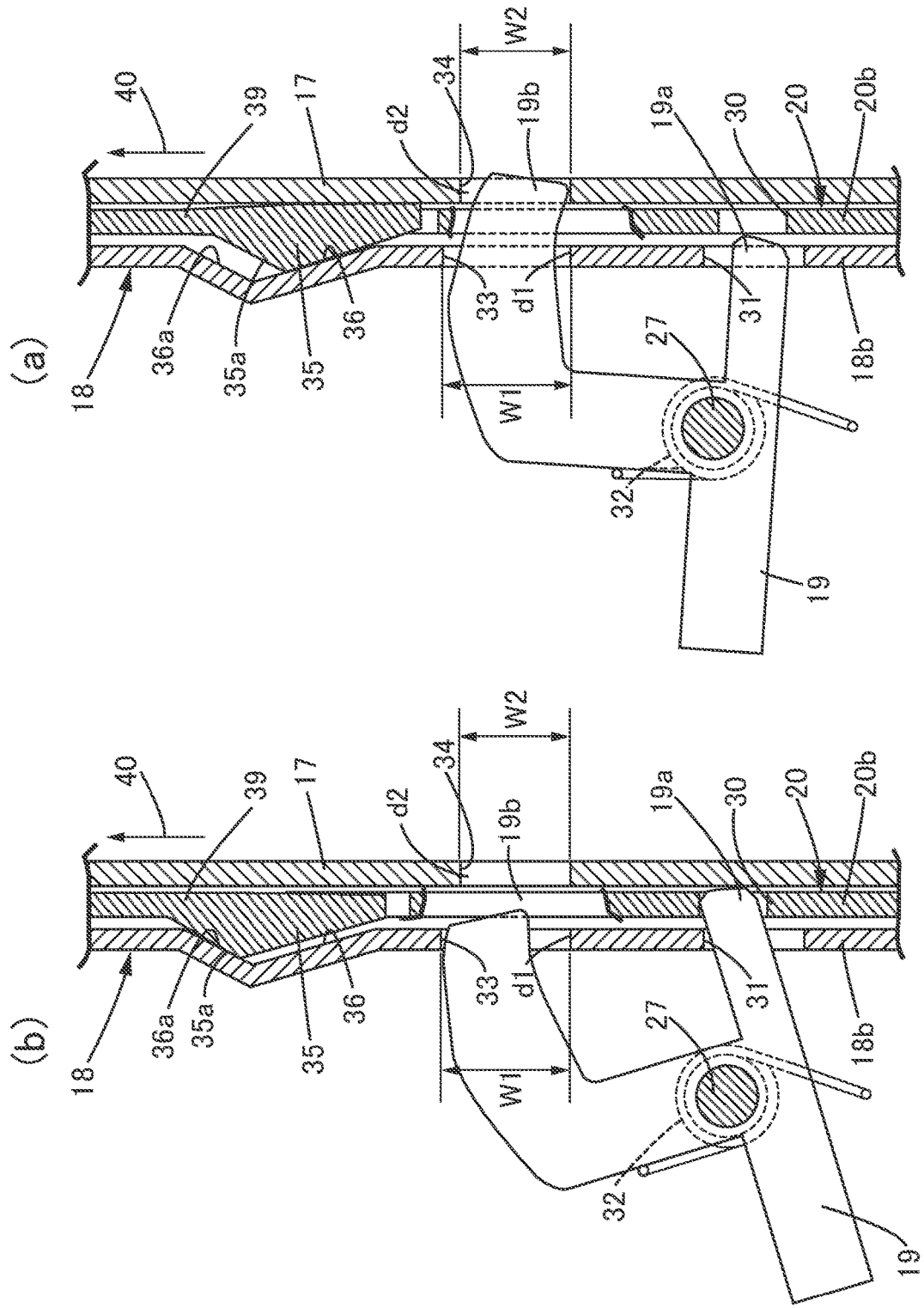
FIG. 5 is a sectional view along line 5-5 in FIG. 3 showing a comparison of (a) a state in which a lock member is at a locked position and (b) a state in which it is at a lock release position. (first embodiment)

Referring in addition to FIG. 5, the first lock member 19 is supported on the first collar portion 18c of the first annular rotating member 18 so that it can operate between a locked position in which as shown in FIG. 5 (a) it engages with the second side wall portion 17d of the first support member 17 and prevents the first annular rotating member 18 from rotating and a lock release position in which as shown in FIG. 5 (b) it releases the engagement with the second side wall portion 17d of the first support member 17 and allows rotation of the first annular rotating member 18, and it is pivotably supported on the first collar portion 18c via a shaft 27 having a vertical axis.

A link arm portion 19a is formed integrally with the first lock member 19, and the first lock member 19 is linked to the first rattle-suppressing member 20 by inserting an extremity part of the link arm portion 19a through a linking hole 30 formed in the first rattle-suppressing member 20. This link arm portion 19a is inserted through a through hole 31 formed in the third side wall portion 18b of the first annular rotating member 18, and when as shown in FIG. 5 (b) the first lock member 19 attains the lock release position it is linked to the linking hole 30, and a pressing force in the pivoting direction acts on the first rattle-suppressing member 20 from the link arm portion 19a.

Furthermore, formed integrally with the first lock member 19 is an engagement arm portion 19b that engages with the third side wall portion 18b of the first annular rotating member 18 and the second side wall portion 17d of the first support member 17 at the locked position but releases the engagement with the second side wall portion 17d of the first support member 17 at the lock release position. The engagement arm portion 19b and the link arm portion 19a are disposed at positions separated from each other in the peripheral direction of the first annular rotating member 18.

A torsion spring 32 surrounding the shaft 27 is provided between the first annular rotating member 18 and the first lock member 19, and the first lock member 19 is pivotingly urged toward the locked position side by virtue of a spring force exhibited by the torsion spring 32.

Formed in an upper part of the third side wall portion 18b of the first annular rotating member 18 is a first through hole 33 through which the engagement arm portion 19b is inserted. An extremity part of the engagement arm portion 19b inserted through the first through hole 33 is present at a position above the fourth side wall portion 20b of the first rattle-suppressing member 20, and when the first lock member 19 attains the locked position as shown in FIG. 5 (a) the extremity part of the engagement arm portion 19b that has been inserted through the first through hole 33 and operated so as to straddle the fourth side wall portion 20b of the first rattle-suppressing member 20 is inserted through a second through hole 34 formed in an upper part of the second side wall portion 17d of the first support member 17.

Moreover, widths W1, W2 of the first and second through holes 33, 34 along the peripheral direction of the first annular rotating member 18 are set so as to create a gap d1, d2 along the peripheral direction between the through holes 33, 34 and the engagement arm portion 19b inserted therethrough.

Referring in addition to FIG. 6, the first rattle-suppressing member 20 is operatively linked to the first lock member 19 so that it is in close contact with both the first support member 17 and the first annular rotating member 18 when the first lock member 19 is at the locked position and a gap is created between itself and the first support member 17 and first annular rotating member 18 when the first lock member 19 is at the lock release position, wedge-shaped first and second projecting parts 35, 37 are formed on one of the first rattle-suppressing member 20 and the first annular rotating member 18, and first and second recess parts 36, 38 housing part of the first and second projecting parts 35, 37 are formed in the other of the first rattle-suppressing member 20 and the first annular rotating member 18, the first and second projecting parts 35, 37 being capable of being fitted into the first and second recess parts 36, 38.

In the first embodiment, in order to enable close contact with both the first support member 17 and the first annular rotating member 18 in the radial direction of the first annular rotating member 18 when the first lock member 19 is at the locked position, an elastic arm part 39 is formed on the fourth side wall portion 20b of the first rattle-suppressing member 20 by cutting and raising so as to extend lengthwise in the peripheral direction of the fourth side wall portion 20b, the first projecting part 35 being formed on an extremity part of the elastic arm part 39, and the first recess part 36 being formed in the third side wall portion 18b of the first annular rotating member 18.

The first projecting part 35 is formed into a wedge shape so as to have a first projecting part-side inclined face 35a whose height gradually decreases in going in a direction of movement 40 of the first rattle-suppressing member 20 in response to the first lock member 19 operating from the lock release position toward the locked position side, and the first recess part 36, which enables the first projecting part 35 to be fitted thereinto, is formed into a triangular shape so as to house part of the first projecting part 35 while having a first recess part-side inclined face 36a opposing the first projecting part-side inclined face 35a.

Furthermore, in order to enable close contact with both the first support member 17 and the first annular rotating member 18 in the axial direction of the first annular rotating member 18 when the first lock member 19 is at the locked position, the second projecting part 37 is formed on the second bottom wall portion 18a of the first annular rotating member 18, and the second recess part 38 is formed in the third bottom wall portion 20a of the first rattle-suppressing member 20.

The second projecting part 37 is formed into a wedge shape so as to have a second projecting part-side inclined face 37a whose height gradually decreases in going in the direction of movement 40 of the first rattle-suppressing member 20 in response to the first lock member 19 being operated from the lock release position toward the locked position side, and the second recess part 38, which enables the second projecting part 37 to be fitted thereinto, is formed so as to house part of the second projecting part 37 while having a second recess part-side inclined face 38a opposing the second projecting part-side inclined face 37a.

When the first lock member 19 is at the locked position, as shown in FIG. 5 (a) and FIG. 6 (a) due to the first and second projecting part-side inclined faces 35a, 37a of the first and second projecting parts 35, 37 closely abutting against the first and second recess part-side inclined faces 36a, 38a of the first and second recess parts 36, 38 the first rattle-suppressing member 20 is in close contact with the first annular rotating member 18 and the first support member 17, and the first rattle-suppressing member 20 is in close contact with both the first support member 17 and the first annular rotating member 18 in each of the radial direction and the axial direction of the first annular rotating member 18 when the first lock member 19 is at the locked position.

Furthermore, when the first lock member 19 attains the lock release position, as shown in FIG. 5 (b) and FIG. 6 (b) the first rattle-suppressing member 20 moves toward the side on which the first and second projecting part-side inclined faces 35a, 37a of the first and second projecting parts 35, 37 move away from the first and second recess part-side inclined faces 36a, 38a of the first and second recess parts 36, 38, thus releasing the rattle-preventing state.

Moreover, the first and second projecting parts 35, 37 and the first and second recess parts 36, 38 are disposed at a plurality of locations spaced in the peripheral direction of the first annular rotating member 18.

Furthermore, a first urging member 41 having a substantially U-shaped form so as to urge the first rattle-suppressing member 20 toward the side on which the first and second projecting parts 35, 37 are fitted into the first and second recess parts 36, 38 is disposed at a plurality of locations along the peripheral direction of the first annular rotating member 18 so as to be for example provided between the third side wall portion 18b of the first annular rotating member 18 and the fourth side wall portion 20b of the first rattle-suppressing member 20.

The operation of the first embodiment is now explained. Since the first seat-rotating device 15 includes the first support member 17 fixed to first base member 16, the first annular rotating member 18 supporting the seat frame 12, disposed on either the outside or the inside of the first support member 17 (on the outside in this embodiment), and rotatably supported on the first base member 16, the first lock member 19 supported on the first annular rotating member 18 so as to be capable of operating between the locked position, in which it engages with the first support member 17 and prevents the first annular rotating member 18 from rotating, and the lock release position, in which it releases the engagement with the first support member 17 and allows rotation of the first annular rotating member 18, and the first rattle-suppressing member 20 disposed between the first support member 17 and the first annular rotating member 18 and operatively linked to the first lock member 19 so as to come into close contact with both the first support member 17 and the first annular rotating member 18 when the first lock member 19 is at the locked position and so as to create a gap from the first support member 17 and the first annular rotating member 18 when the first lock member 19 is at the lock release position, due to the first rattle-suppressing member 20 attaining a state in which it is in close contact with both the first support member 17 and the first annular rotating member 18 when the first lock member 19 is at the locked position and attaining a state in which a gap is created between the first rattle-suppressing member 20 and the first support member 17 and first annular rotating member 18 when the first lock member 19 is at the lock release position, rattling of the seat 11 can be prevented in a stationary state, and when rotating the seat 11 it is possible to facilitate the rotation.

Furthermore, since the first rattle-suppressing member 20 is disposed between the first support member 17 and the first annular rotating member 18 while being formed into an annular shape so as to be capable of rotating around an axis coaxial with the first annular rotating member 18, and the link arm portion 19a linked to the first rattle-suppressing member 20 is formed integrally with the first lock member 19 pivotably supported on the first annular rotating member 18, it is possible to operate the first rattle-suppressing member 20 in association with operation of the first lock member 19 with a simple structure.

Moreover, since the engagement arm portion 19b, which engages with the first annular rotating member 18 and the first support member 17 at the locked position but releases the engagement with the first support member 17 at the lock release position, is formed integrally with the first lock member 19 at a position separated from the link arm portion 19a in the peripheral direction of the first annular rotating member 18, a mechanism for locking the first annular rotating member 18 and a mechanism for operating the first rattle-suppressing member 20 in association with the first lock member 19 can be combined in a compact manner while avoiding an increase in the size in a direction along the rotational axis of the first annular rotating member 18.

Furthermore, since the wedge-shaped first and second projecting parts 35, 37 having the first and second projecting part-side inclined faces 35a, 37a, whose height gradually decreases in going in the direction of movement of the first rattle-suppressing member 20 in response to the first lock member 19 operating from the lock release position toward the locked position side, are formed on one of the first rattle-suppressing member 20 and the first annular rotating member 18, and the first and second recess parts 36, 38 housing part of the first and second projecting parts 35, 37 while having the first and second recess part-side inclined faces 36a, 38a opposing the first and second projecting part-side inclined faces 35a, 37a are formed in the other of the first rattle-suppressing member 20 and the first annular rotating member 18 so that the first and second projecting parts 35, 37 can be fitted into the first and second recess parts 36, 38, it is possible to facilitate release of the fitted state between the first and second projecting parts 35, 37 and the first and second recess parts 36, 38 when the first lock member 19 is operated from the locked position to the lock release position.

Since the first rattle-suppressing member 20 is urged by the first urging member 41 to the side on which the first and second projecting parts 35, 37 are fitted into the first and second recess parts 36, 38, it is possible to strongly maintain fitting of the first and second projecting parts 35, 37 into the first and second recess parts 36, 38 in the locked state, thereby reliably suppressing the occurrence of rattling.

Furthermore, since the first and second through holes 33, 34, through which the engagement arm portion 19b is inserted at the locked position, are formed in the first annular rotating member 18 and the first support member 17 respectively, and the widths W1, W2 of the first and second through holes 33, 34 along the peripheral direction of the first annular rotating member 18 are set so that the gap d1, d2 is created along the peripheral direction between the through holes 33, 34 and the engagement arm portion 19b inserted therethrough, rattling is suppressed in the locked state due to the first and second projecting parts 35, 37 being fitted into the first and second recess parts 36, 38, thus preventing rattling from being generated between the engagement arm portion 19b and the first annular rotating member 18 and first support member 17, enabling the dimensional tolerance between the engagement arm portion 19b and the first and second through holes 33, 34 to be set loosely, facilitating production and assembly, and contributing to a reduction in the cost.

Moreover, since the first and second projecting parts 35, 37 and the first and second recess parts 36, 38 are disposed at a plurality of locations spaced in the peripheral direction of the first annular rotating member 18, the first and second projecting parts 35, 37 are fitted into the first and second recess parts 36, 38 at a plurality of locations spaced in the peripheral direction of the first annular rotating member 18, and it is possible to disperse the fitting load in the peripheral direction while avoiding it being concentrated at one position.

Furthermore, since the first rattle-suppressing member 20 is disposed between the first support member 17 and the first annular rotating member 18 so that it can be in close contact with both the first support member 17 and the first annular rotating member 18 in each of the radial direction and the axial direction of the first annular rotating member 18 when the first lock member 19 is at the locked position, it is possible to suppress rattling of the first annular rotating member 18 in the radial direction, in the peripheral direction, and in the axial direction.

Moreover, since the seat 11 is a vehicular seat having the seat cushion 11a and the seat back 11b disposed above the seat cushion 11a and being slidably supported by means of the pair of slide rails 13 provided on the vehicular floor face, it is possible to apply effectively the present invention as a vehicular seat-rotating device.

Second Embodiment

Figure 7:
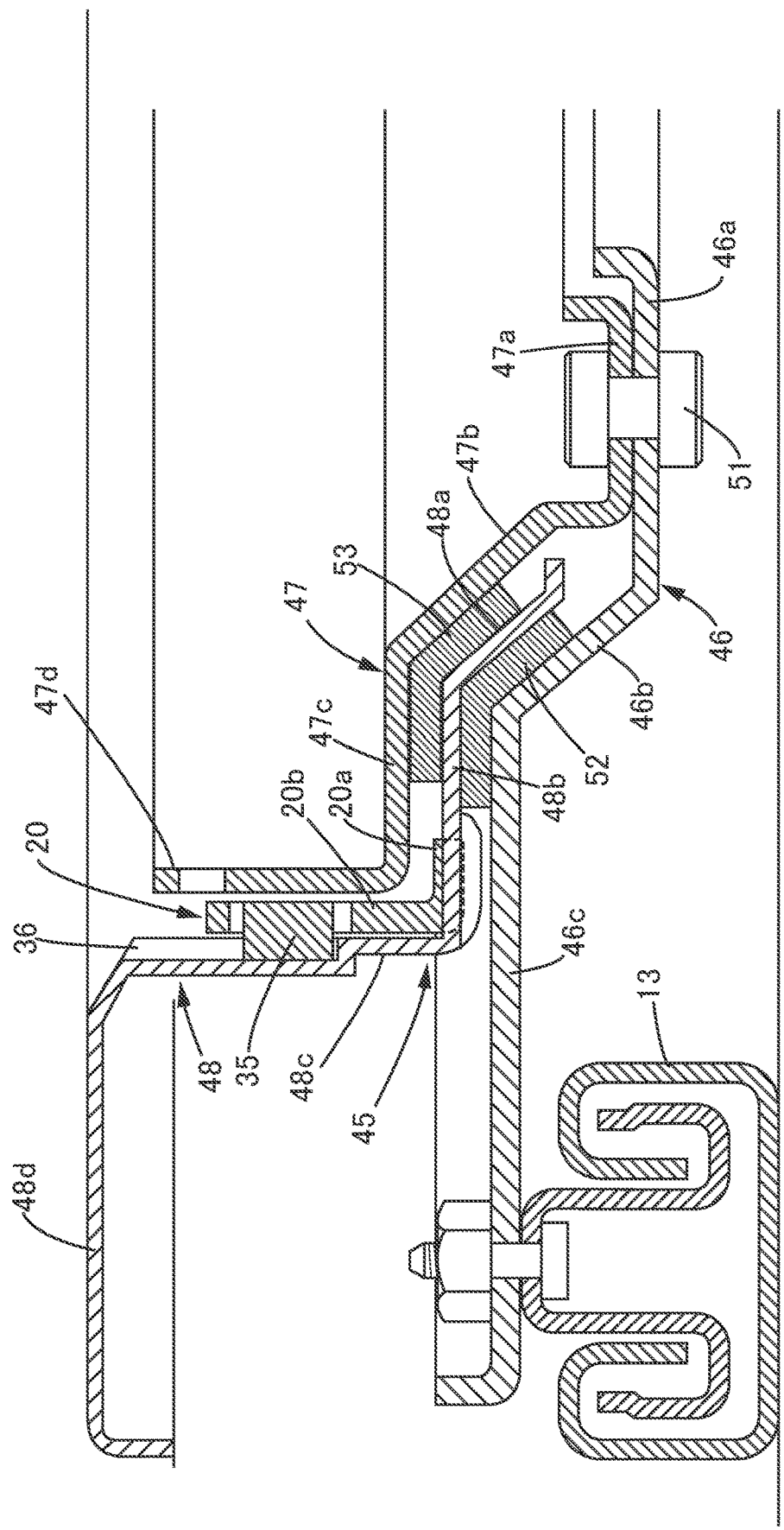
FIG. 7 is a sectional view, corresponding to FIG. 3, of a second embodiment. (second embodiment)

A second embodiment of the present invention is explained by reference to FIG. 7; parts corresponding to those of the first embodiment are denoted by the same reference numerals and symbols and are only illustrated, detailed explanation thereof being omitted.

A second seat-rotating device 45 includes a second support member 47 that is fixed to a second base member 46, a second annular rotating member 48 that is disposed on the outside of the second support member 47 and is rotatably supported on the second base member 46, the first lock member 19 (see first embodiment), which is supported on the second annular rotating member 48 so as to switch between a locked state and release of the locked state of the second annular rotating member 48 with respect to the second support member 47, and the first rattle-suppressing member 20, which is formed into an annular shape and is disposed between the second support member 47 and the second annular rotating member 48 so as to operate in association with operation of the first lock member 19.

The second base member 46 has an annular fourth bottom wall portion 46a, a first taper portion 46b that is connectedly provided on the outer periphery of the fourth bottom wall portion 46a so as to increase in diameter in going upward, and a second collar portion 46c that protrudes outward from an upper end part of the first taper portion 46b, the second collar portion 46c being slidably supported on the slide rail 13.

The second support member 47 integrally has an annular fifth bottom wall portion 47a that is abutted against the fourth bottom wall portion 46a of the second base member 46, a second taper portion 47b that rises upward from the outer periphery of the fifth bottom wall portion 47a so as to increase in diameter in going upward and is disposed above the first taper portion 46b, an annular second flat wall portion 47c that protrudes radially outward from an upper end part of the second taper portion 47b, and a cylindrical fifth side wall portion 47d that rises upward from the outer periphery of the second flat wall portion 47c. A plurality of locations in the peripheral direction of the fifth bottom wall portion 47a are joined to the fourth bottom wall portion 46a of the second base member 46 by means of a rivet 51.

The second annular rotating member 48 integrally has a third taper portion 48a that is disposed between the first taper portion 46b of the second base member 46 and the second taper portion 47b of the second support member 47 and increases in diameter in going upward, a third flat wall portion 48b that protrudes radially outward from an upper end part of the third taper portion 48a and is disposed between the second collar portion 46c of the second base member 46 and the second flat wall portion 47c of the second support member 47, a cylindrical sixth side wall portion 48c that rises upward from the outer periphery of the third flat wall portion 48b, and a third collar portion 48d that protrudes outward from an upper end part of the sixth side wall portion 48c.

The first rattle-suppressing member 20 is formed into an annular shape and is disposed between the second support member 47 and the second annular rotating member 48 so that it can rotate around an axis coaxial with the second annular rotating member 48, and integrally has an annular third bottom wall portion 20a that is disposed between the second flat wall portion 47c of the second support member 47 and the third flat wall portion 48a of the second annular rotating member 48, and a cylindrical fourth side wall portion 20b that rises upward from the outer periphery of the third bottom wall portion 20a so as to be disposed between the fifth side wall portion 47d of the second support member 47 and the sixth side wall portion 48b of the second annular rotating member 48, its cross-sectional shape being substantially L-shaped.

An annular first bearing member 52 is disposed between the second base member 46 and the second annular rotating member 48, and an annular second bearing member 53 is disposed between the second support member 47 and the second annular rotating member 48.

The first and second bearing members 52, 53 are formed into an annular shape using a low friction material. The first bearing member 52 is disposed between the first taper portion 46b and second collar portion 46c of the second base member 46 and the third taper portion 48a and third flat wall portion 48b of the second annular rotating member 48, and it is formed so as to have a bent cross-sectional shape corresponding to a bent shape of the first taper portion 46b and the second collar portion 46c and a bent shape of the third taper portion 48a and the third flat wall portion 48b.

Furthermore, the second bearing member 53 is disposed between the second taper portion 47b and second flat wall portion 47c of the second support member 47 and the third taper portion 48a and third flat wall portion 48b of the second annular rotating member 48, and it is formed so as to have a bent cross-sectional shape corresponding to a bent shape of the second taper portion 47b and the fourth second flat wall portion 47c and the bent shape of the third taper portion 48a and the third flat wall portion 48b.

In accordance with the second embodiment, it becomes possible to further reduce the sliding resistance when the second annular rotating member 48 is rotating, due to the first and second bearing members 52, 53 being planar it is possible to reduce the dimension in the height direction of the second seat-rotating device 45, and it is easy to carry out positioning of the first and second bearing members 52, 53.

Third Embodiment

A third embodiment of the present invention is explained by reference to FIG. 8 to FIG. 13. First, in FIG. 8 to FIG. 10, a third seat-rotating device 55 in accordance with the present invention is disposed on a third base member 56 supported by the slide rail 13 so that it can slide in the vehicle fore-and-aft direction, and the third seat-rotating device 55 includes a third support member 57 that is fixed to the third base member 56, a third annular rotating member 58 that supports the seat frame 12 (see first embodiment), is disposed on either the outside or the inside of the third support member 57 (on the outside in the third embodiment), and is rotatably supported on the third base member 56, a second lock member 59 that is supported on the third annular rotating member 58 so as to switch between a locked state and release of the locked state of the third annular rotating member 58 with respect to the third support member 57, and an annular second rattle-suppressing member 60 that is disposed between the third support member 57 and the third annular rotating member 58 so that it can operate in association with operation of the second lock member 59.

The third base member 56 has an annular sixth bottom wall portion 56a, an annular seventh bottom wall portion 56b that is disposed beneath the sixth bottom wall portion 56a so as to be continuous from the outer periphery of the sixth bottom wall portion 56a via a step, a cylindrical seventh side wall portion 56c that rises upward from the outer periphery of the seventh bottom wall portion 56b, and a fourth collar portion 56d that protrudes outward from an upper end part of the seventh side wall portion 56c, the fourth collar portion 56d being slidably supported on the slide rail 13.

The third support member 57 integrally has an annular eighth bottom wall portion 57a that has its inner peripheral part abutting against the sixth bottom wall portion 56a of the third base member 56, a fourth taper portion 57b that is formed so as to have a diameter that increases in going upward and is connectedly provided on the outer periphery of the eighth bottom wall portion 57a, a cylindrical eighth side wall portion 57c that rises upward from an upper end part of the fourth taper portion 57b, an annular fourth flat wall portion 57d that protrudes radially outward from an upper end part of the eighth side wall portion 57c, a fifth taper portion 57e that is formed so as to have a diameter that increases in going downward and is connected to the outer periphery of the fourth flat wall portion 57d, an annular fifth flat wall portion 57f that protrudes radially outward from a lower end part of the fifth taper portion 57e, and a fifth collar portion 57g that is connected to the outer periphery of the fifth flat wall portion 57f via a step and protrudes outward above the fifth flat wall portion 57f, a plurality of locations in the peripheral direction of the eighth bottom wall portion 57a being joined to the sixth bottom wall portion 56a of the third base member 56 by means of a rivet 61.

The third annular rotating member 58 is formed so as to integrally have a sixth taper portion 58a that is formed so as to have a diameter that increases in going upward and is disposed beneath the fourth taper portion 57b of the third support member 57, a cylindrical ninth side wall portion 58b that rises upward from an upper end part of the sixth taper portion 58a and is disposed on the outer side of the eighth side wall portion 57c, an annular sixth flat wall portion 58c that protrudes radially outward from an upper end part of the ninth side wall portion 58b, a seventh taper portion 58d that is formed so as to have a diameter that increases in going upward and is connected to the outer periphery of the sixth flat wall portion 58c, and a sixth collar portion 58e that protrudes outward from an upper end part of the seventh taper portion 58d.

A bearing 62 is disposed between the sixth taper portion 58a of the third annular rotating member 58 and the seventh bottom wall portion 56b and seventh side wall portion 56c of the third base member 56, the bearing 62 being formed by retaining a ball 64 at a plurality of locations in the peripheral direction of an annular retainer 63.

Figure 11:
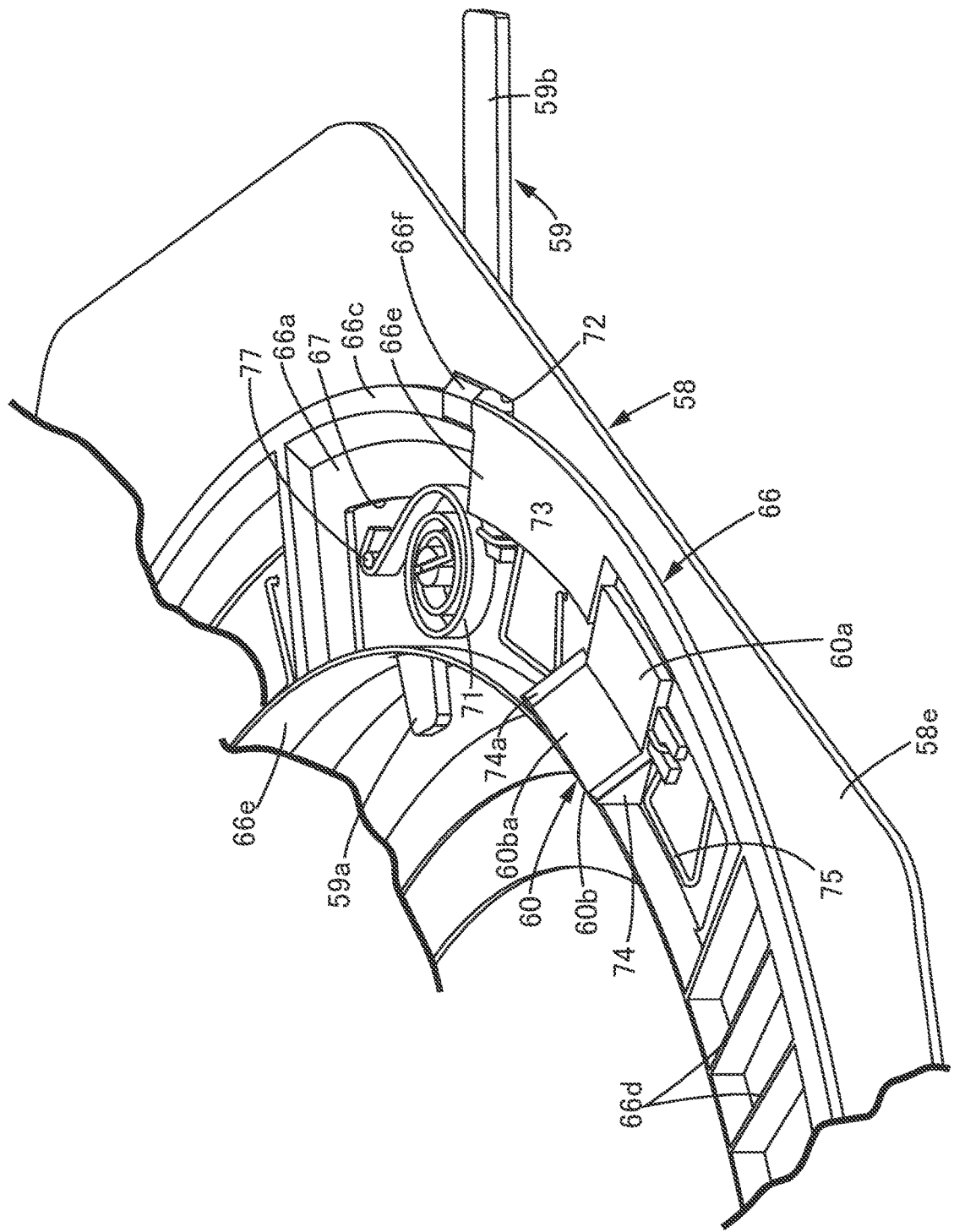
FIG. 11 is a perspective view of the vicinity of a lock member and a rattle-suppressing member when a support member is omitted. (third embodiment)

Referring in addition to FIG. 11, the second rattle-suppressing member 60 is moved from a locked position to a lock release position by being pushed by means of a first pushing-out member 66 formed into an annular shape so as to pivot in response to operation of the second lock member 59, the first pushing-out member 66 being slidably placed on the fifth flat wall portion 58c of the third annular rotating member 58.

The first pushing-out member 66 is formed so as to have an annular ninth bottom wall portion 66a that is disposed on the fifth flat wall portion 58c, a cylindrical inside wall portion 66b that rises upward from an inner peripheral part of the ninth bottom wall portion 66a while opposing the eighth side wall portion 57c of the third support member 57 from the outside, and a tapered outside wall portion 66c that rises upward from an outer peripheral part of the ninth bottom wall portion 66a so as to have a diameter that increases in going upward, the outside wall portion 66c being slidably abutted against the seventh taper portion 58d of the third annular rotating member 58.

An elongated hole-shaped opening 67 that is long in the peripheral direction is formed at a plurality of locations spaced in the peripheral direction of the ninth bottom wall portion 66a of the first pushing-out member 66, and a reinforcing rib 66d joining the inside wall portion 66b and the outside wall portion 66c is provided at a plurality of locations spaced in the peripheral direction of the ninth bottom wall portion 66a in an area where no opening 67 is disposed.

A pushing projection portion 66e is projectingly provided on the ninth bottom wall portion 66a on the outside of a portion corresponding to an intermediate part in the longitudinal direction of the opening 67, the pushing projection portion 66e protruding inward from the outside wall portion 66c.

Figure 9:
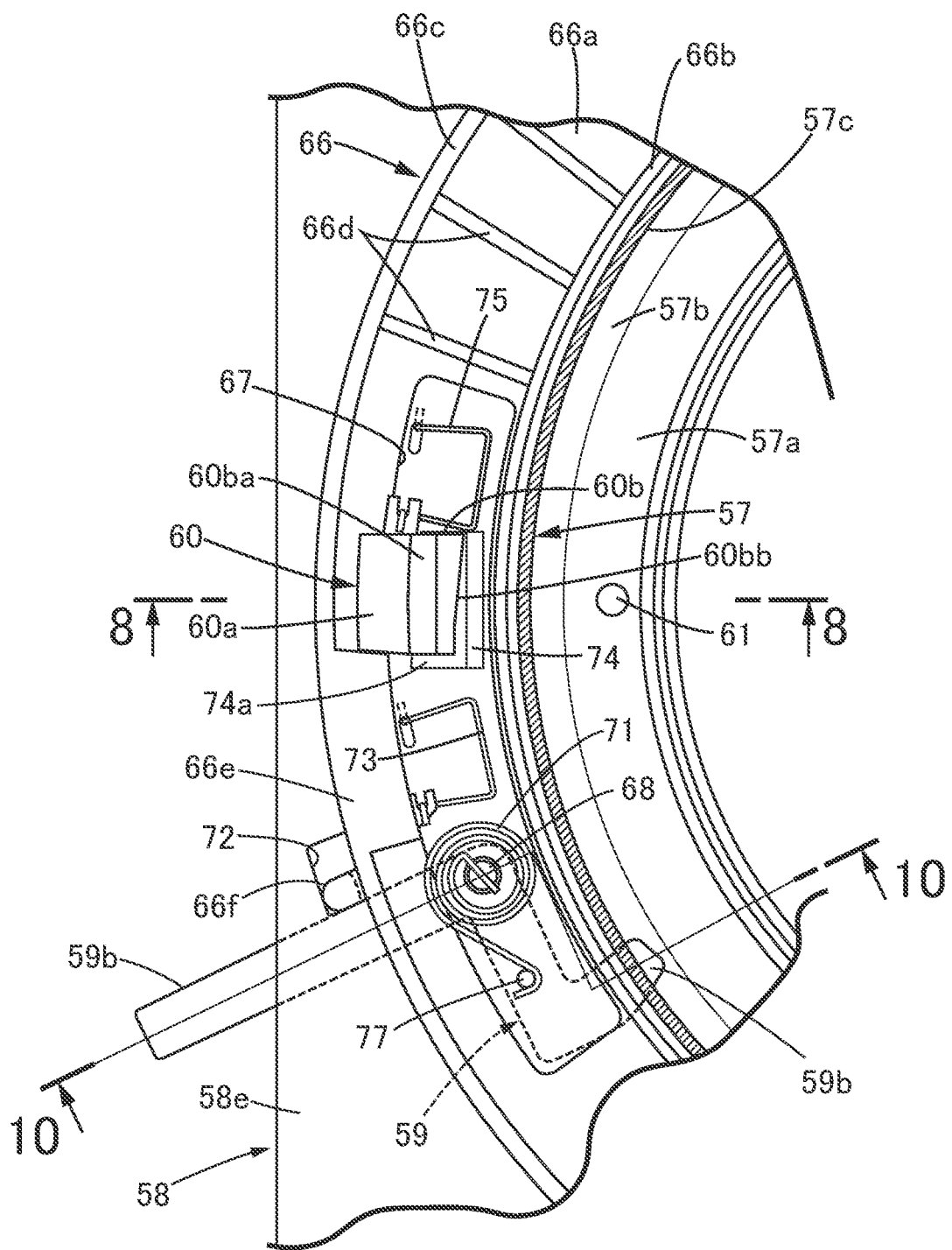
FIG. 9 is a sectional view along line 9-9 in FIG. 8. (third embodiment)
Figure 10:
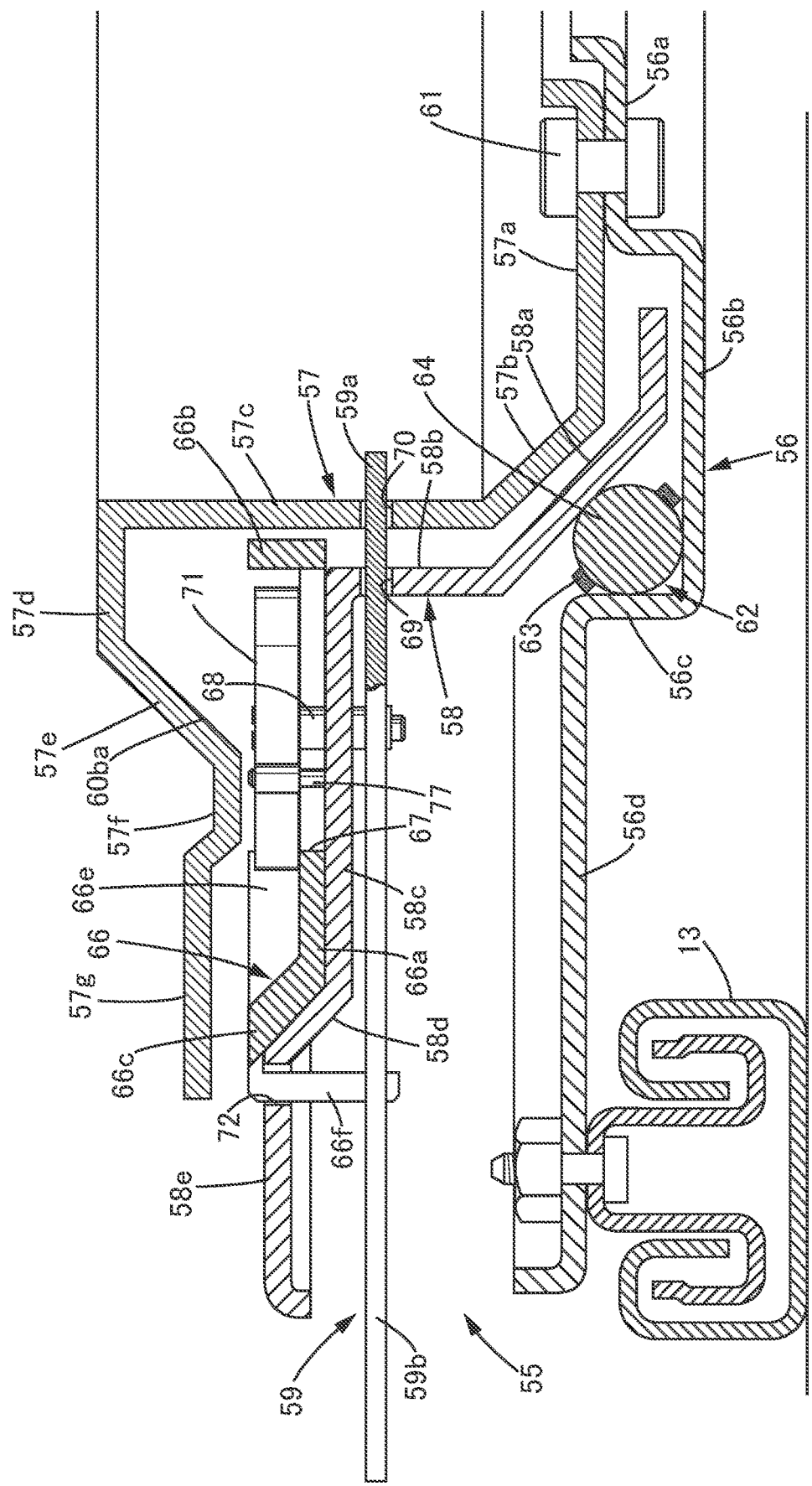
FIG. 10 is a sectional view along line 10-10 in FIG. 9. (third embodiment)
Figure 12:
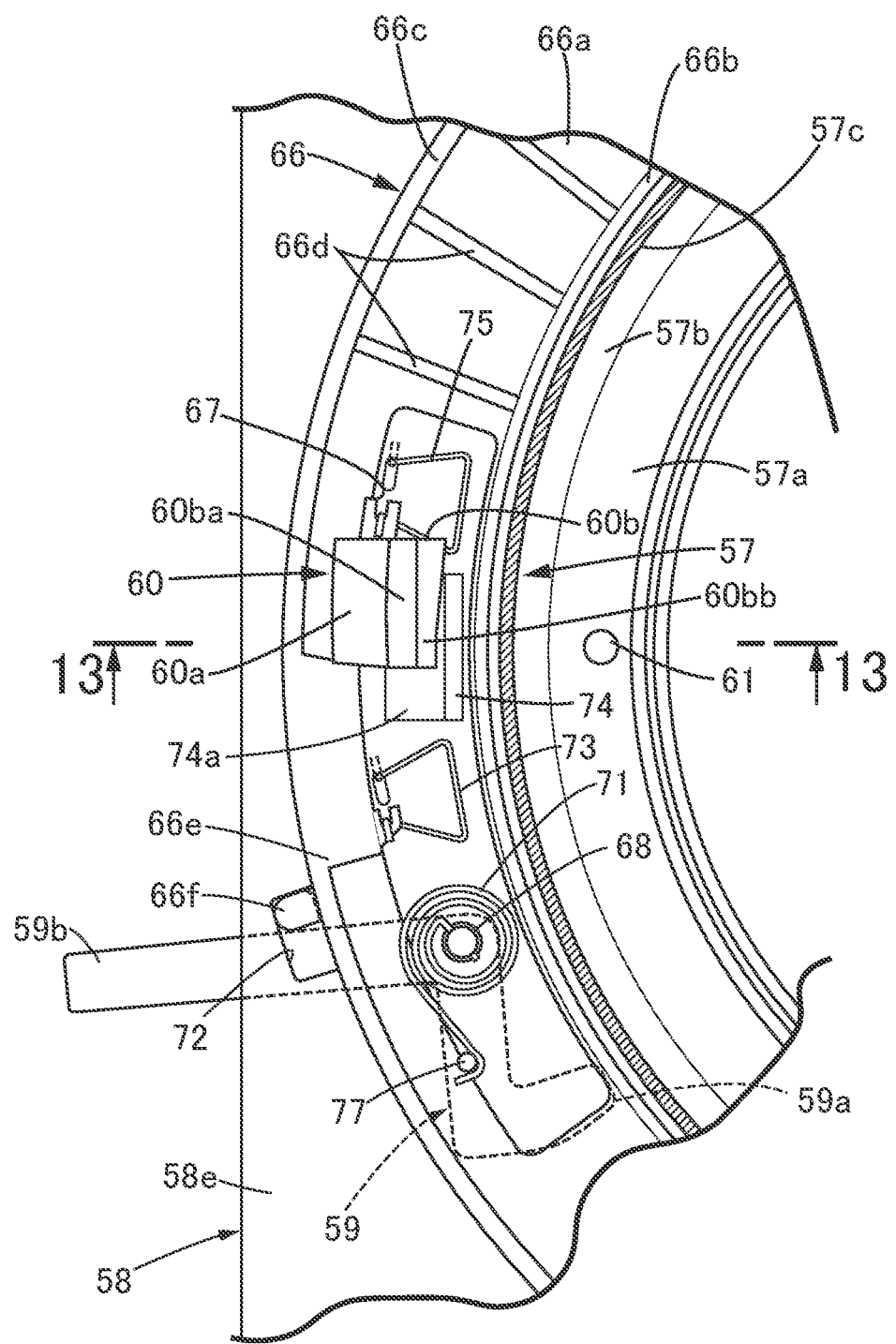
FIG. 12 is a sectional plan view, corresponding to FIG. 8, in a lock release state. (third embodiment)

The second lock member 59 is disposed beneath the sixth flat wall portion 58c of the third annular rotating member 58, and is supported on the sixth flat wall portion 58c so as to be operated between a locked position in which as shown in FIG. 9 and FIG. 10 the second lock member 59 engages with the eighth side wall portion 57c of the third support member 57 to thus prevent the third annular rotating member 58 from rotating and a lock release position in which as shown in FIG. 12 the engagement with the eighth side wall portion 57c is released so as to allow the third annular rotating member 58 to rotate.

The second lock member 59 is pivotably supported on the sixth flat wall portion 58c via a shaft 68 having a vertical axis, and the shaft 68 is fixed to the second lock member 59 and extends through the sixth flat wall portion 58c so as to be disposed within the opening 67 further to one side in the peripheral direction than the pushing projection portion 66e provided on the third annular rotating member 58 and is pivotably supported on the sixth flat wall portion 58c.

The second lock member 59 has an engagement arm portion 59a that has a substantially L-shaped form so as to engage with the ninth side wall portion 58b of the third annular rotating member 58 and the eighth side wall portion 57c of the third support member 57 at the locked position but release the engagement with the ninth side wall portion 58b and the eighth side wall portion 57c at the lock release position, and the shaft 68 is fixed to a base end part of the engagement arm portion 59a.

Formed in the ninth side wall portion 58c is a third through hole 69 through which the engagement arm portion 59a is inserted when the second lock member 59 attains the locked position, and formed in the eighth side wall portion 57c is a fourth through hole 70 through which an extremity part of the engagement arm portion 59a inserted through the third through hole 69 is inserted and engaged when the second lock member 59 attains the locked position.

The second lock member 59 integrally has an operating arm portion 59b that extends linearly outward from a base end part of the engagement arm portion 59a and has its extremity part protruding further outward than the sixth collar portion 58e of the third annular rotating member 58, and the second lock member 59 can be pivoted between the locked position and the lock release position by operating the extremity part of the operation arm portion 59b.

A spiral spring 71 for pivotingly urging the second lock member 59 toward the locked position side is provided between the third annular rotating member 58 and the second lock member 59. The spiral spring 71 is housed within the first pushing-out member 66 so as to surround the shaft 68, one end part of the spiral spring 71 is engaged with the shaft 68, and the other end part of the spiral spring 71 is engaged with a pin 77 implanted in the sixth flat wall portion 58c of the third annular rotating member 58.

A pressure-receiving arm portion 66f is provided integrally with the outside wall portion 66c of the first pushing-out member 66 at a position adjacent to the pushing projection portion 66e in the peripheral direction, the pressure-receiving arm portion 66f being pushed by the operating arm portion 59b of the second lock member 59 when the second lock member 59 pivots from the locked position to the lock release position. The pressure-receiving arm portion 66f extends through an elongated hole 72 provided in the sixth collar portion 58e of the third annular rotating member 58 and extends downward up to a position where it abuts against the operating arm portion 59b. The elongated hole 72 is therefore formed so as to have a length that allows the pressure-receiving arm portion 66f to operate when the second lock member 59 pivots between the locked position and the lock release position. A substantially U-shaped second urging member 73 is provided between the first pushing-out member 66 and the third annular rotating member 58, the second urging member 73 urging the first pushing-out member 66 toward the side on which the pressure-receiving arm portion 66f is abutted against the operating arm portion 59b of the second lock member 59 and being disposed within the opening 67 between the pushing projection portion 66e and the shaft 68.

The second rattle-suppressing member 60 is disposed within the first pushing-out member 66 at a position in which the pushing projection portion 66e is sandwiched between the second rattle-suppressing member 60 and the second lock member 59 in the peripheral direction of the first pushing-out member 66, a projecting part 74 extending through the opening 67 of the first pushing-out member 66 and protruding upward is projectingly provided on the third annular rotating member 58 at a position corresponding to the second rattle-suppressing member 60, and the projecting part 74 is formed into a triangular shape while having an inclined face 74a opposing the fifth taper portion 57e of the third support member 57 in parallel therewith from the inside.

The second rattle-suppressing member 60 integrally has a pressure-receiving portion 60a that abuts against the pushing projection portion 66e from the side opposite to the second lock member 59 while being in sliding contact with the ninth bottom wall portion 66a of the first pushing-out member 66 on the outside of the opening 67 and being in sliding contact with the sixth flat wall portion 58c of the third annular rotating member 58 within the opening 67, and a wedge portion 60b that is inclined so as to be positioned radially inward of the first pushing-out member 66 in going upward and extending obliquely upward from the pressure-receiving portion 60a, the wedge portion 60b being disposed between the fifth taper portion 57e of the third support member 57 and the projecting part 74 of the third annular rotating member 58.

A first face 60ba, opposing the fifth taper portion 57e, of the wedge portion 60b is formed as a slightly curved face so that its entire face can abut against the fifth taper portion 57e, whereas a second face 60bb of the wedge portion 60b opposing the inclined face 74a of the projecting part 74 is formed in an inclined manner so that the distance from the first face 60ba decreases in going closer toward the pushing projection portion 66e, the wedge part 60 being formed so as to have a wedge-shaped cross-section.

A substantially U-shaped third urging member 75 urging the second rattle-suppressing member 60 toward the side on which the pressure-receiving portion 60a is pushed against the pushing projection portion 66e is provided between the second rattle-suppressing member 60 and the third annular rotating member 58, the third urging member 75 being disposed within the opening 67 on the side opposite to the second urging member 73 with respect to the pushing projection portion 66e.

Figure 8:
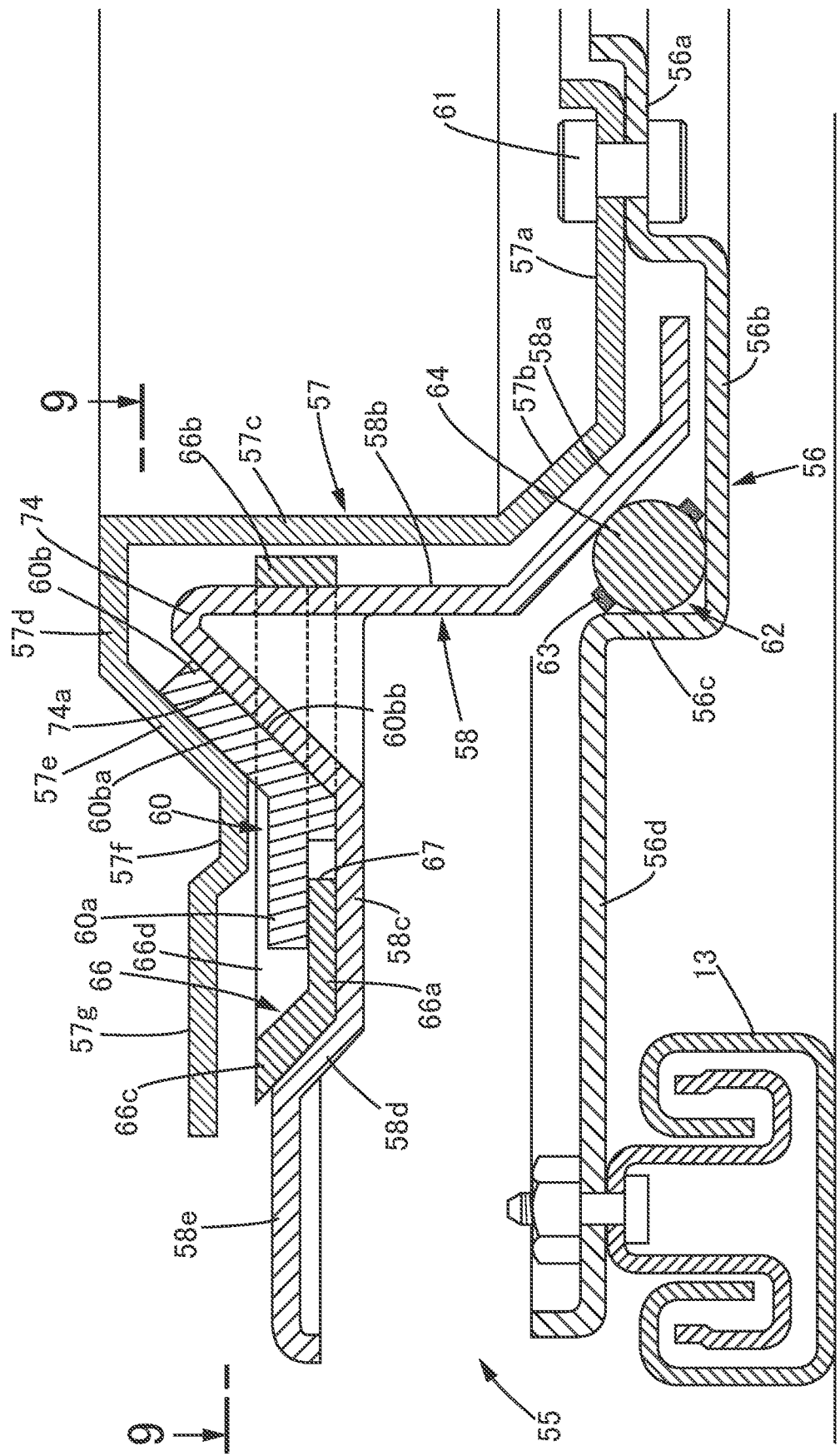
FIG. 8 is a sectional plan view of a seat-rotating device of a third embodiment in a locked state and is a sectional view along line 8-8 in FIG. 9. (third embodiment)

When the second lock member 59 is at the locked position, as shown in FIG. 8 the second rattle-suppressing member 60 is at a position in which the second face 60bb is in contact with the inclined face 74a of the projecting part 74 via a thick portion of the wedge portion 60b, and the second rattle-suppressing member 60 is in close contact with the inclined face 74a of the projecting part 74 of the third annular rotating member 58 and the fifth taper portion 57e of the third support member 57.

Figure 13:
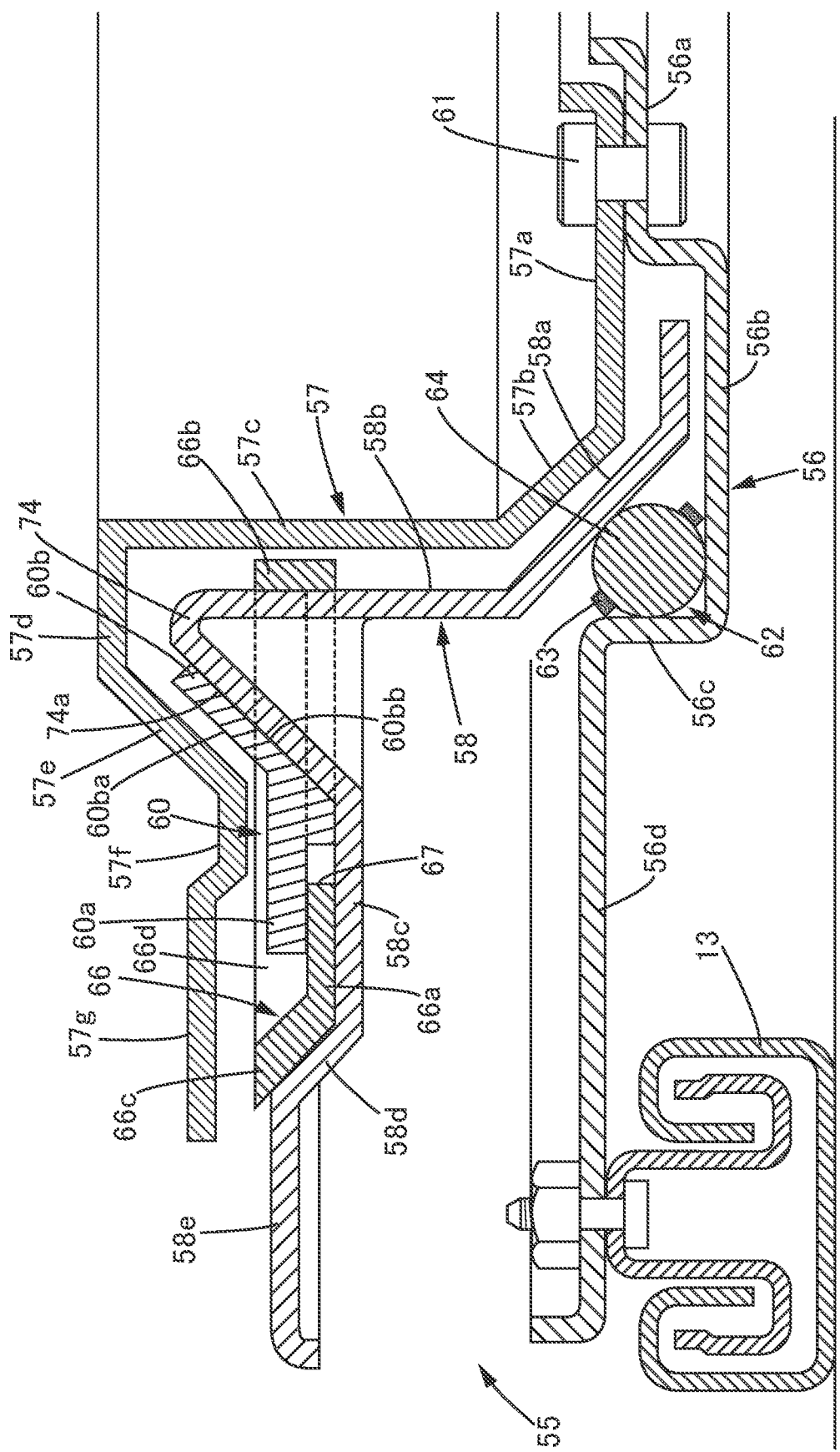
FIG. 13 is a sectional view along line 13-13 in FIG. 12. (third embodiment)

When the second lock member 59 attains the lock release position, due to the second lock member 59 being pushed by the pushing projection portion 66e of the first pushing-out member 66 as shown in FIG. 12 the second rattle-suppressing member 60 moves while compressing the third urging member 75, the second rattle-suppressing member 60 attains a position in which the second face 60bb is in contact with the inclined face 74a of the projecting part 74 via a thin portion of the wedge portion 60b, and a gap is created between the fifth taper portion 57e of the third support member 57 and the wedge portion 60b as shown in FIG. 13, thus allowing the rattle-preventing state to be released.

In accordance with the third embodiment also, in the same manner as in the first and second embodiments, it is possible to prevent the seat 11 (see first embodiment) from rattling in its stationary state, and to facilitate rotation of the seat 11 when it is rotating. Moreover, compared with the first and second embodiments, a link arm part for linking to the second rattle-suppressing member 60 is not provided in the second lock member 59, and since it is unnecessary to provide the ninth side wall portion 58b of the third annular rotating member 58 with a through hole for the link arm part to be inserted through, it is possible to suppress the height of the ninth side wall portion 58b and contribute to making the third seat-rotating device 55 compact in the height direction.

Fourth Embodiment

Figure 14:
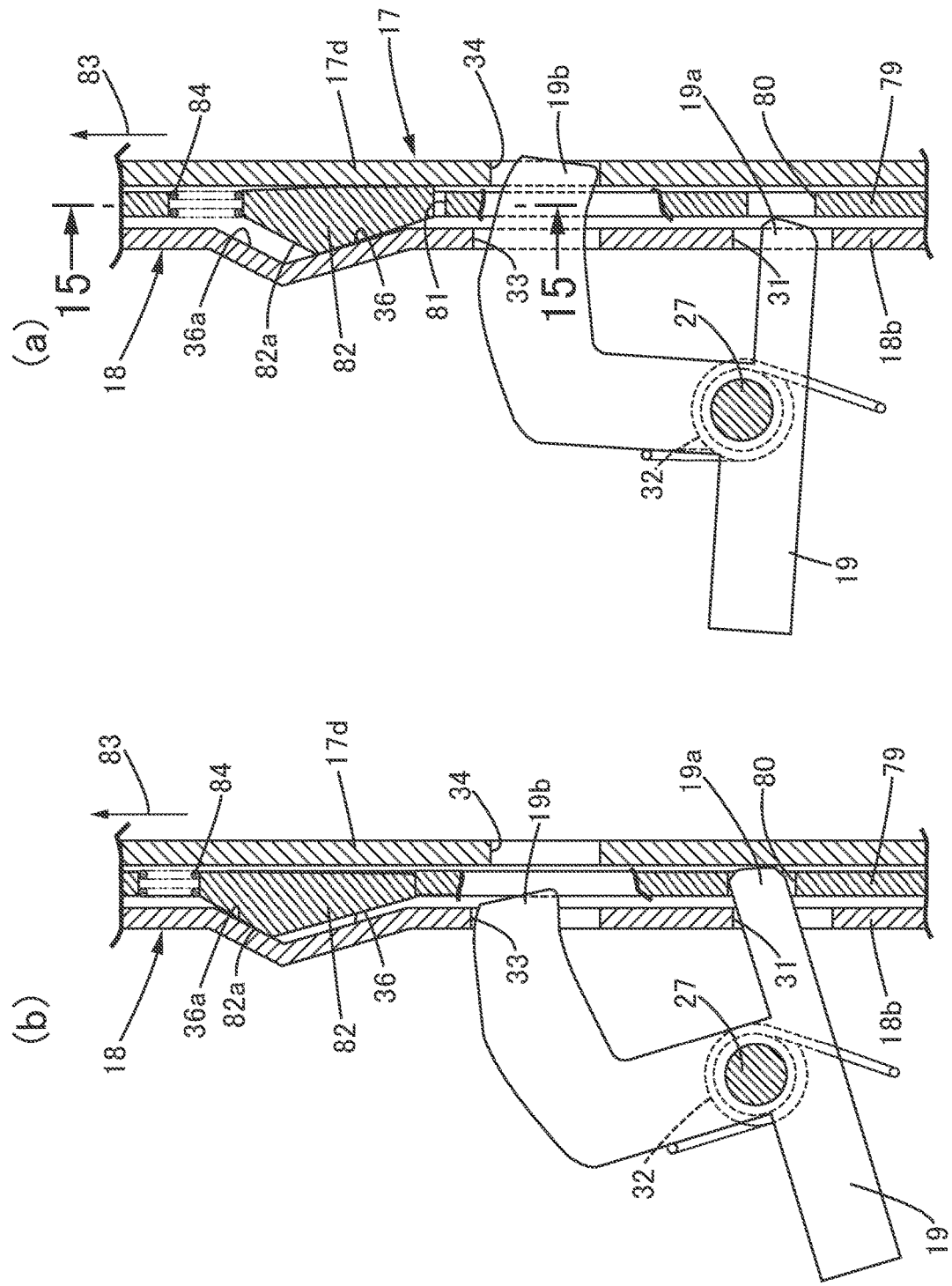
FIG. 14 is a sectional view, corresponding to FIG. 5, showing a comparison of (a) a state in which a lock member of a fourth embodiment is at a locked position and (b) a state in which it is at a lock release position. (fourth embodiment)
Figure 15:
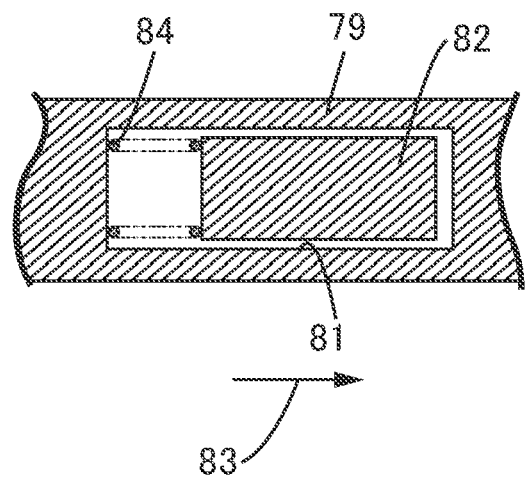
FIG. 15 is a sectional view along line 15-15 in FIG. 14. (fourth embodiment)

FIG. 14 and FIG. 15 show a fourth embodiment of the present invention; parts corresponding to those of the first embodiment are denoted by the same reference numerals and symbols and are only illustrated, detailed explanation thereof being omitted.

An annular second pushing-out member 79 is disposed between the cylindrical second side wall portion 17d of the first support member 17 and the cylindrical third side wall portion 18b of the first annular rotating member 18. A housing hole 81 extending lengthwise in the peripheral direction of the second pushing-out member 79 is provided at a plurality of locations spaced in the peripheral direction of the second pushing-out member 79, and a third rattle-suppressing member 82 disposed between the second side wall portion 17d and the third side wall portion 18b is housed in the housing hole 81.

On the other hand, the first lock member 19 is pivotably supported on the first annular rotating member 18, and the first lock member 19 can pivot between a locked position in which as shown in FIG. 14 (a) it engages with the second side wall portion 17d of the first support member 17 so as to prevent the first annular rotating member 18 from rotating and a lock release position in which as shown in FIG. 14 (b) the engagement with the second side wall portion 17d of the first support member 17 is released so as to allow the first annular rotating member 18 to rotate.

The link arm portion 19a of the first lock member 19 is inserted through the through hole 31 formed in the third side wall portion 18b of the first annular rotating member 18, and the extremity part of the link arm portion 19a can be inserted through a linking hole 80 formed in the second pushing-out member 79, inserting the extremity part of the link arm portion 19a through the linking hole 80 linking the first lock member 19 to the second pushing-out member 79. The link arm portion 19a is linked to the linking hole 80 when as shown in FIG. 14 (b) the first lock member 19 attains the lock release position, and a pressing force in the pivoting direction acts on the second pushing-out member 79 from the link arm portion 19a.

The engagement arm portion 19b of the first lock member 19 engages with the first through hole 33 formed in the third side wall portion 18b of the first annular rotating member 18 and the second through hole 34 of the second side wall portion 17d of the first support member 17 at the locked position shown in FIG. 14 (a) but disengages from the second through hole 34 at the lock release position shown in FIG. 14 (b) so as to release the engagement with the first support member 17, and the engagement arm portion 19b operates so as to straddle the second pushing-out member 79 between the locked position and the lock release position.

The first recess part 36 housing part of the third rattle-suppressing member 82 is formed in the third side wall portion 18b of the first annular rotating member 18 so that the third rattle-suppressing member 82 can be fitted thereinto.

The third rattle-suppressing member 82 is formed into a wedge shape so as to have an inclined face 82a whose height gradually decreases in going in a direction of movement 83 of the second pushing-out member 79 in response to the first lock member 19 operating from the lock release position toward the locked position side, and the first recess part 36, which enables the third rattle-suppressing member 82 to be fitted thereinto, is formed into a triangular shape so as to house part of the third rattle-suppressing member 82 while having the first recess part-side inclined face 36a opposing the inclined face 82a.

A coil spring 84 is provided in a compressed state between, among opposite end parts in the longitudinal direction of the housing hole 81 formed in the second pushing-out member 79, a front end part along the direction of movement 83 and the third rattle-suppressing member 82, the third rattle-suppressing member 82 being urged in a direction opposite to the direction of movement 83.

When the first lock member 19 is at the locked position, as shown in FIG. 14 (a), the inclined face 82a of the third rattle-suppressing member 82 abuts closely against the first recess part-side inclined face 36a of the first recess part 36, and the third rattle-suppressing member 82 is thereby put into close contact with the first annular rotating member 18 and the first support member 17, thus preventing the first annular rotating member 18 from rattling.

When the first lock member 19 attains the lock release position, as shown in FIG. 14 (b), among the opposite end parts in the longitudinal direction of the housing hole 81, a rear end part along the direction of movement 83 abuts against the third rattle-suppressing member 82, the third rattle-suppressing member 82 is pushed in the direction of movement 83 against the urging force of the coil spring 84, and the third rattle-suppressing member 82 moves toward the side on which the inclined face 82a of the third rattle-suppressing member 82 moves away from the first recess part-side inclined face 36a, thus releasing the state in which rattling is prevented.

In accordance with the fourth embodiment also, in the same manner as in the first to third embodiments, it is possible to prevent the seat 11 (see first embodiment) from rattling in a stationary state and to facilitate rotation when rotating the seat 11.

Fifth Embodiment

Figure 16:
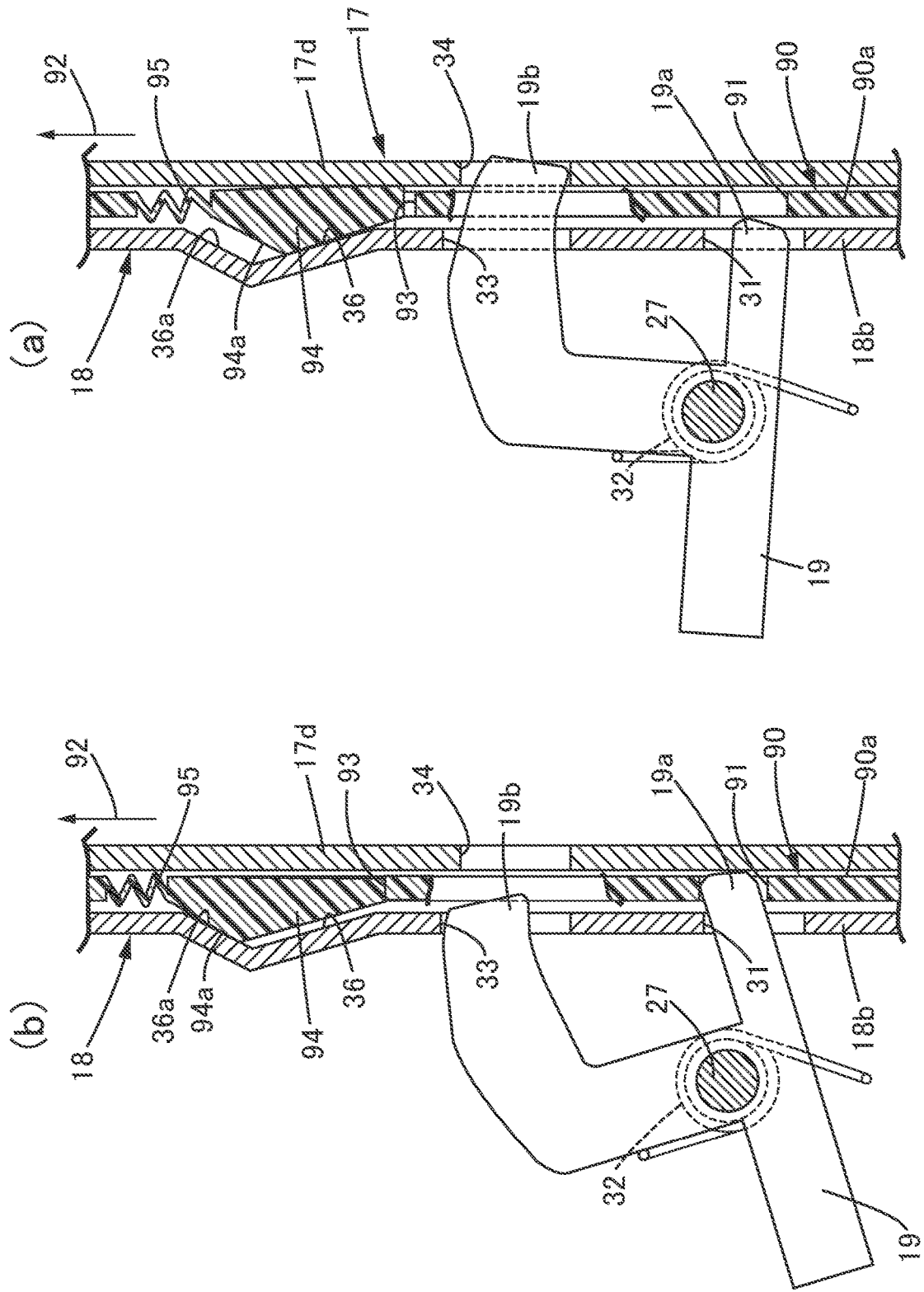
FIG. 16 is a sectional view, corresponding to FIG. 5, showing a comparison of (a) a state in which a lock member of a fifth embodiment is at a locked position and (b) a state in which it is at a lock release position. (fifth embodiment)

FIG. 16 shows a fifth embodiment of the present invention; parts corresponding to those of the fourth embodiment are denoted by the same reference numerals and symbols and are only illustrated, detailed explanation thereof being omitted.

An annular rattle-suppressing member main portion 90a of a fourth rattle-suppressing member 90 is disposed between the cylindrical second side wall portion 17d of the first support member 17 and the cylindrical third side wall portion 18b of the first annular rotating member 18.

The link arm portion 19a of the first lock member 19 is inserted through the through hole 31 formed in the third side wall portion 18b of the first annular rotating member 18, the extremity part of the link arm portion 19a can be inserted through a linking hole 91 formed in the rattle-suppressing member main portion 90a of the fourth rattle-suppressing member 90, and inserting the extremity part of the link arm portion 19a through the linking hole 91 links the first lock member 19 to the fourth rattle-suppressing member 90. The link arm portion 19a is linked to the linking hole 91 when as shown in FIG. 16 (b) the first lock member 19 attains a lock release position, and a pressing force in the pivoting direction acts on the fourth rattle-suppressing member 90 via the link arm portion 19a.

The engagement arm portion 19b of the first lock member 19 engages with the first through hole 33 formed in the third side wall portion 18b of the first annular rotating member 18 and the second through hole 34 of the second side wall portion 17d of the first support member 17 when it is at the locked position shown in FIG. 16 (a), but it disengages from the second through hole 34 so as to release the engagement with the first support member 17 when it is at the lock release position shown in FIG. 16 (b), and the engagement arm portion 19b operates so as to straddle the rattle-suppressing member main portion 90a of the fourth rattle-suppressing member 90 between the locked position and the lock release position.

Formed integrally with the rattle-suppressing member main portion 90a are a wedge part 94 and an elastic part 95 providing a connection between the wedge part 94 and the rattle-suppressing member main part 90a. The wedge part 94 and the elastic part 95 are formed by cutting and raising part of the rattle-suppressing member main portion 90a so as to extend lengthwise in the peripheral direction, and a housing hole 93 is formed in the rattle-suppressing member main portion 90a so that the wedge part 94 and the elastic part 95 are disposed therein.

The fourth rattle-suppressing member 90 moves in a direction of movement 92 in response to the first lock member 19 operating from the lock release position toward the locked position side, and the wedge part 94 is formed into a wedge shape so as to have an inclined face 94a whose height decreases in going in the direction of movement 92. A front end part of the housing hole 93 and the wedge part 94 are integrally linked by means of the elastic part 95, which has a waveform in which peaks and valleys are connected in turn along the peripheral direction of the rattle-suppressing member main portion 90a, and the elastic part 95 exhibits a resilient force that urges the wedge part 94 in a direction opposite to the direction of movement 92.

On the other hand, formed in the third side wall portion 18b of the first annular rotating member 18 is a triangular first recess part 36 having a first recess part-side inclined face 36a opposing the inclined face 94a of the wedge part 94 so that the wedge part 94 can be fitted into the first recess part 36 while housing part of the wedge part 94.

When the first lock member 19 is at the locked position, as shown in FIG. 16 (a) the inclined face 94a of the wedge part 94 abuts closely against the first recess part-side inclined face 36a of the first recess part 36, and the fourth rattle-suppressing member 90 comes into close contact with the first annular rotating member 18 and the first support member 17, thereby preventing the first annular rotating member 18 from rattling.

When the first lock member 19 attains the lock release position, as shown in FIG. 16 (b) among opposite end parts in the longitudinal direction of the housing hole 93 a rear end part along the direction of movement 92 abuts against the wedge part 94, the wedge part 94 is pushed in the direction of movement 92 against the urging force of the elastic part 95, and the wedge part 94 moves toward the side on which the inclined face 94a of the wedge part 94 moves away from the first recess part-side inclined face 36a, thus releasing the rattle-preventing state.

In accordance with the fifth embodiment also, in the same manner as in the first to fourth embodiments, it is possible to prevent the seat 11 (see first embodiment) from rattling in the stationary state and to facilitate rotation when the seat 11 is rotating. Moreover, since the fourth rattle-suppressing member 90 integrally has the wedge part 94 and the elastic part 95, it is possible to contribute to a reduction in the number of components.

A vehicular seat-rotating device in which air is fed to a seat face of a seat that can be rotated with respect to a floor from the floor side via a duct is known from Patent Application Laid-open No. 2010-137651, and since this arrangement has a structure in which a blower for feeding air is disposed on the outside in the width direction on the left and right of a rotation mechanism, an increase in the size in the width direction of the seat-rotating device cannot be avoided. Therefore, a seat-rotating device that can solve such a problem and can have a compact size while having an air feed structure such as a blower in addition to a rotation mechanism is explained in the following sixth and seventh embodiments.

Furthermore, a seat-rotating device in which a cushion-side pressure-receiving member that receives a load from above a seat cushion is mounted on a seat frame is disclosed by Japanese Patent Application Laid-open No. 2010-173491, which is referred to as Patent Document 1; in this arrangement the cushion-side pressure-receiving member is disposed above a rotation mechanism, and an increase in the size in the vertical direction of the seat-rotating device cannot be avoided. Therefore, a seat-rotating device that can solve such a problem and can have a compact size in the vertical direction is explained in the following sixth embodiment.

Sixth Embodiment

The sixth embodiment of the present invention is explained by reference to FIG. 17 to FIG. 24; parts corresponding to those of the first to fifth embodiments are denoted by the same reference numerals and symbols and are only illustrated, detailed explanation thereof being omitted.

Figure 17:
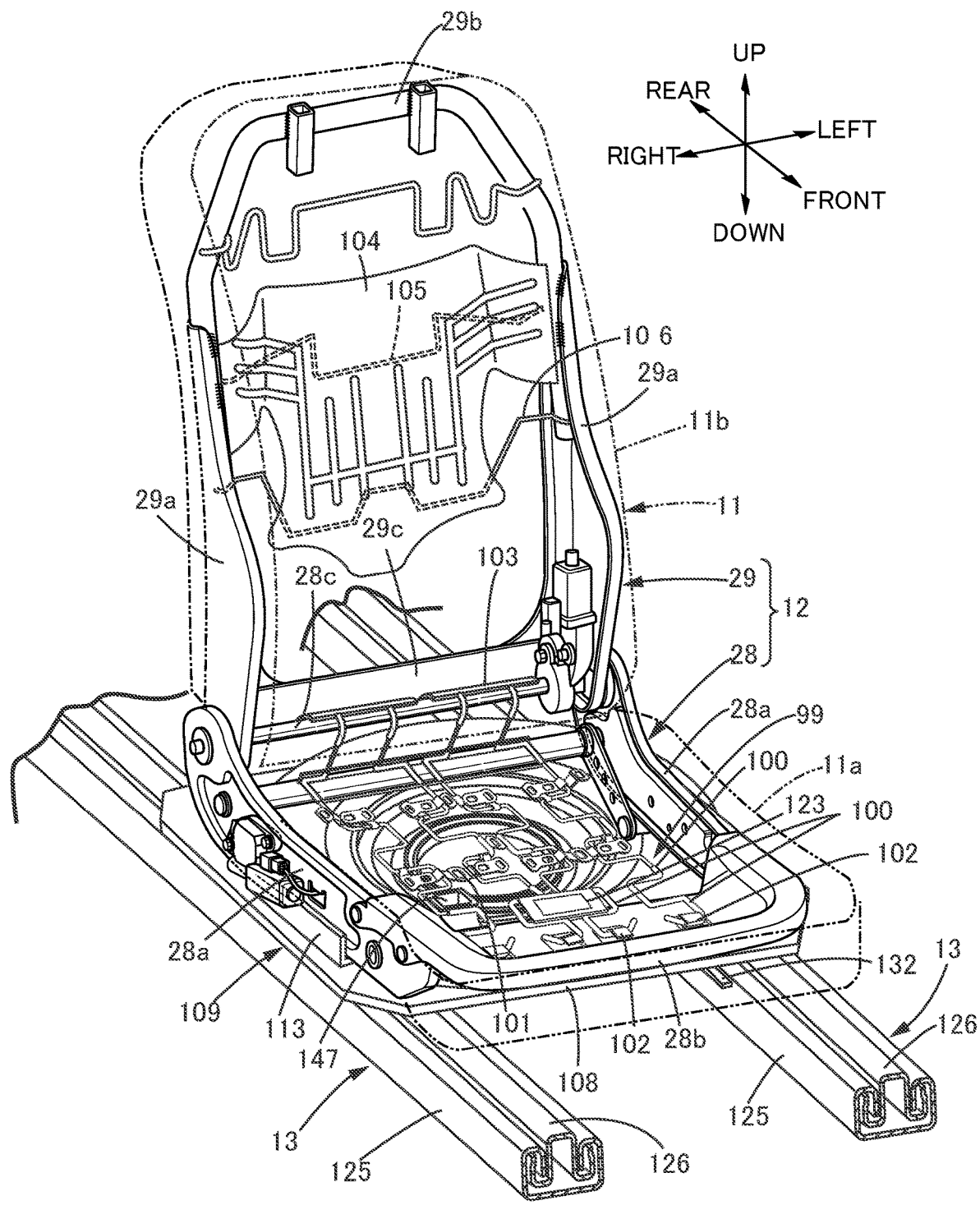
FIG. 17 is a perspective view showing a state in which a seat frame of a sixth embodiment is present on a rotation mechanism. (sixth embodiment)

First, in FIG. 17, the seat cushion frame 16 of the seat frame 12 of the seat 11 has a pair of side frames 28a that are arranged at positions spaced from each other in the left-and-right direction and extend linearly in the fore-and-aft direction, a pan frame 28b that links front end parts of the side frames 28a, and a rear pipe 28c that links rear end parts of the pair of side frames 28a.

Figure 18:
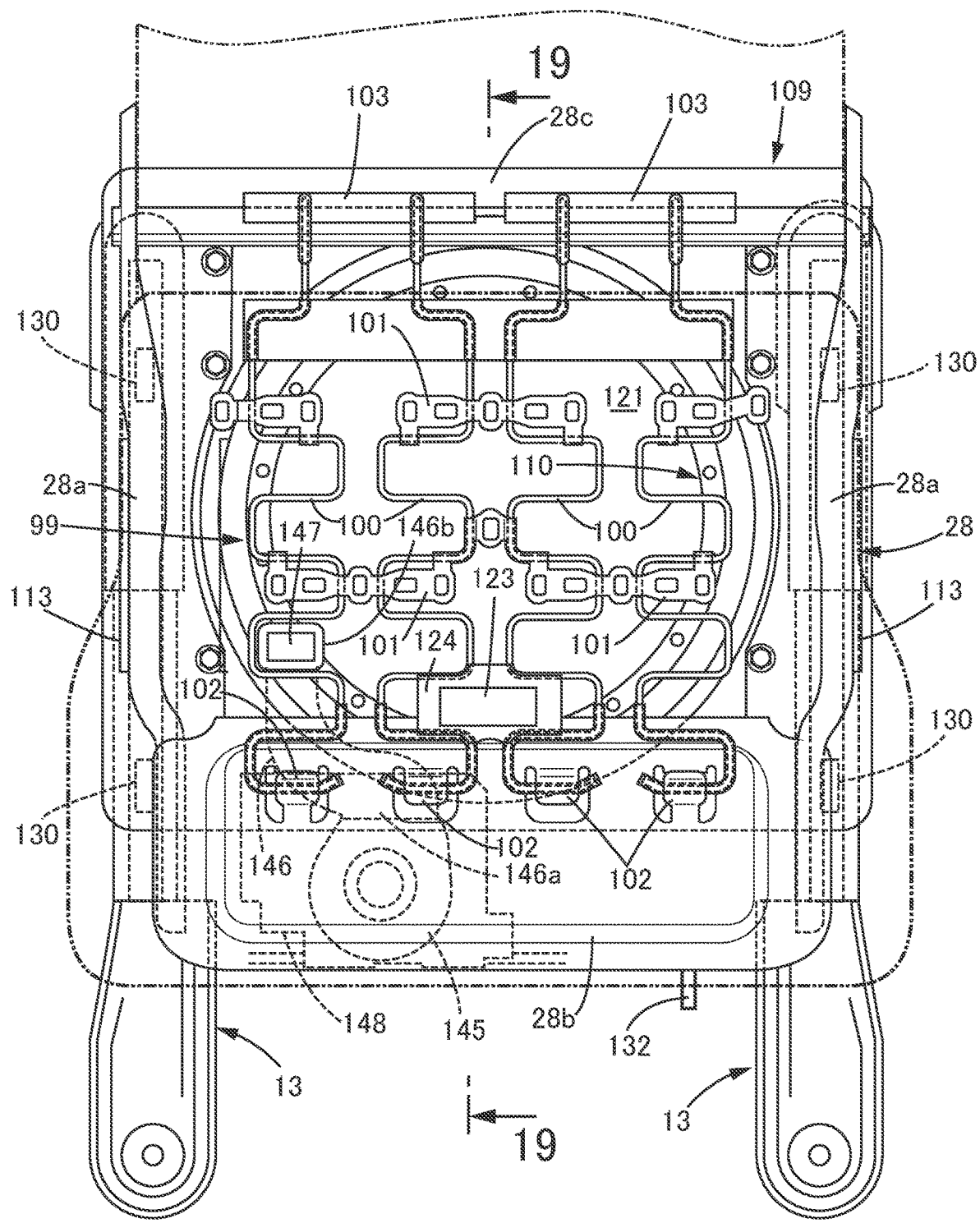
FIG. 18 is a plan view when a cushion-side pressure-receiving member and the rotation mechanism are viewed from above. (sixth embodiment)

In FIG. 18, a cushion-side pressure-receiving member 99 that receives a load from above the seat cushion 11a is stretched between the pan frame 28b and the rear pipe 28c of the seat cushion frame 16. The cushion-side pressure-receiving member 99 has a plurality (four in this embodiment) of seat springs 100 formed by curving a metal wire into a zig-zag so as to snake from left to right, the seat springs 100 being disposed so that adjacent seat springs 100 have lateral symmetry, and adjacent seat springs 100 are linked to each other by means of a plurality of intermediate part-linking members 101 insert molded from a resin integrally with the seat springs 100.

Front end parts of the plurality of seat springs 100 are each engaged with a latching part 102 provided on the pan frame 28b of the seat frame 12. Rear end parts of mutually adjacent seat springs 100 are engaged with the rear pipe 28c of the seat frame 12 and linked by means of a rear end part-linking member 103 insert molded from a resin integrally with the seat spring 100, and the rear end part-linking member 103 is formed so as to cover the rear pipe 28c.

Referring again to FIG. 17, the seat back frame 29 has a pair of seat back side frames 29a that are arranged at positions spaced from each other in the left-and-right direction and extend in the vertical direction, an upper frame 29b that links upper end parts of the seat back side frames 29a, and a lower frame 29c that links lower end parts of the pair of seat back side frames 29a.

A back-side pressure-receiving member 104 that is formed from a resin, etc. so as to be elastically deformable is disposed between the pair of seat back side frames 29a, and the back-side pressure-receiving member 104 is stretched between the left and right seat back side frames 29a via an upper link wire 105 and a lower link wire 106.

Referring in addition to FIG. 19 to FIG. 22, the seat frame 12 is supported on a fourth base member 108 that is supported by means of the slide rail 13 so that it can slide in the vehicle fore-and-aft direction, the seat frame 12 being capable of rotating around a vertical axis via a fourth seat-rotating device 109. The fourth seat-rotating device 109 includes a fourth support member 110 that is fixed to the fourth base member 108 and fourth annular rotating member 111 that supports the seat frame 12 and is rotatably supported on the fourth base member 108, at least part of the fourth annular rotating member 111 being fixedly disposed above the fourth base member 108 and being formed into an annular shape. The fourth support member 110 is fixed to the fourth base member 108 while sandwiching between itself and the fourth base member 108 at least an inside portion along the radial direction of the fourth annular rotating member 111.

The fourth base member 108 has an annular tenth bottom wall portion 108a, a cylindrical tenth side wall portion 108b that rises upward from an outer peripheral part of the tenth bottom wall portion 108a, and a seventh collar portion 108c that protrudes outward from an upper end part of the tenth side wall portion 108b, the seventh collar portion 108c being formed into a rectangular shape.

The fourth support member 110 has an annular eleventh bottom wall portion 110a that abuts against the tenth bottom wall portion 108a of the fourth base member 108 from above, a cylindrical eleventh side wall portion 110b that rises upward slightly from the outer periphery of the eleventh bottom wall portion 110a, an eighth taper portion 110c that is formed so as to have a diameter that increases in going upward and is connectedly provided on an upper end part of the eleventh side wall portion 110b, an annular seventh flat wall portion 110d that is connected to an upper end part of the eighth taper portion 110c, and a cylindrical twelfth side wall portion 110e that rises upward from the outer periphery of the seventh flat wall portion 110d. The eleventh bottom wall portion 110a is joined to the tenth bottom wall portion 110a of the fourth base member 108 via a plurality of rivets 112.

The fourth annular rotating member 111 has a ninth taper portion 111a that is disposed at a position opposing the eighth taper portion 110c of the fourth support member 110 from the outer side and formed so as to have a diameter that increases in going upward, a cylindrical thirteenth side wall portion 111b that rises upward from an upper end part of the ninth taper portion 111a so as to oppose the eleventh side wall portion 110b of the fourth support member 110 from the outer side, and an eighth collar portion 111c that protrudes outward from the thirteenth side wall portion 111b, the eighth collar portion 111c being formed into a rectangular shape. That is, the ninth taper portion 111a, which is an inside portion along the radial direction of the fourth annular rotating member 111, is sandwiched between the fourth support member 110 and the fourth base member 108.

A bracket 113 extending in parallel with the slide rail 13 is fastened to the eighth collar portion 111c by means of a plurality of first bolts 114 and second nuts 115. The side frame 28a of the seat cushion frame 16 of the seat frame 12 is joined to the bracket 113, and the side frames 28a extend linearly at positions spaced from each other and are fixedly disposed on the eighth collar portion 111c of the fourth annular rotating member 111.

A pair of second virtual vertical faces VF2 passing through inside edges of the pair of side frames 28a are positioned further inside in the left-and-right direction than the first virtual vertical face VF1, and the fourth base member 108 is disposed further inside than the second virtual vertical face VF2. That is, the fourth base member 108 is disposed on the inner side of the pair of side frames 28a.

The fourth annular rotating member 111 is rotatably supported on an annular rotation support part 116 of the fourth base member 108 via a bearing 117, and the rotation support part 116 is formed into a substantially L-shaped cross-section from the tenth bottom wall portion 108a and the tenth side wall portion 108b of the fourth base member 108.

The bearing 117 is formed by retaining a ball 119 at a plurality of locations in the peripheral direction of an annular retainer 118, and an annular recess part 120 for the ball 119 to roll over is formed in the eighth taper portion 110c of the fourth annular rotating member 111.

A circular housing part 121 is formed in a central part of the fourth annular rotating member 111 from the ninth taper portion 111a and the thirteenth side wall portion 111b of the fourth annular rotating member 111 so as to open both upward and downward, and the fourth support member 110 is housed within the housing part 121.

At least part of the cushion-side pressure-receiving member 99 is housed in the housing part 121 so as to be present at a position where it overlaps the fourth annular rotating member 111 when viewed from the side. That is, in FIG. 19, at least part (part on the rear side along the vehicle fore-and-aft direction in this embodiment) of the cushion-side pressure-receiving member 99 is present below a virtual plane PL passing an upper end of the fourth annular rotating member 111, that is, an upper face of the eighth collar portion 111c.

Figure 19:
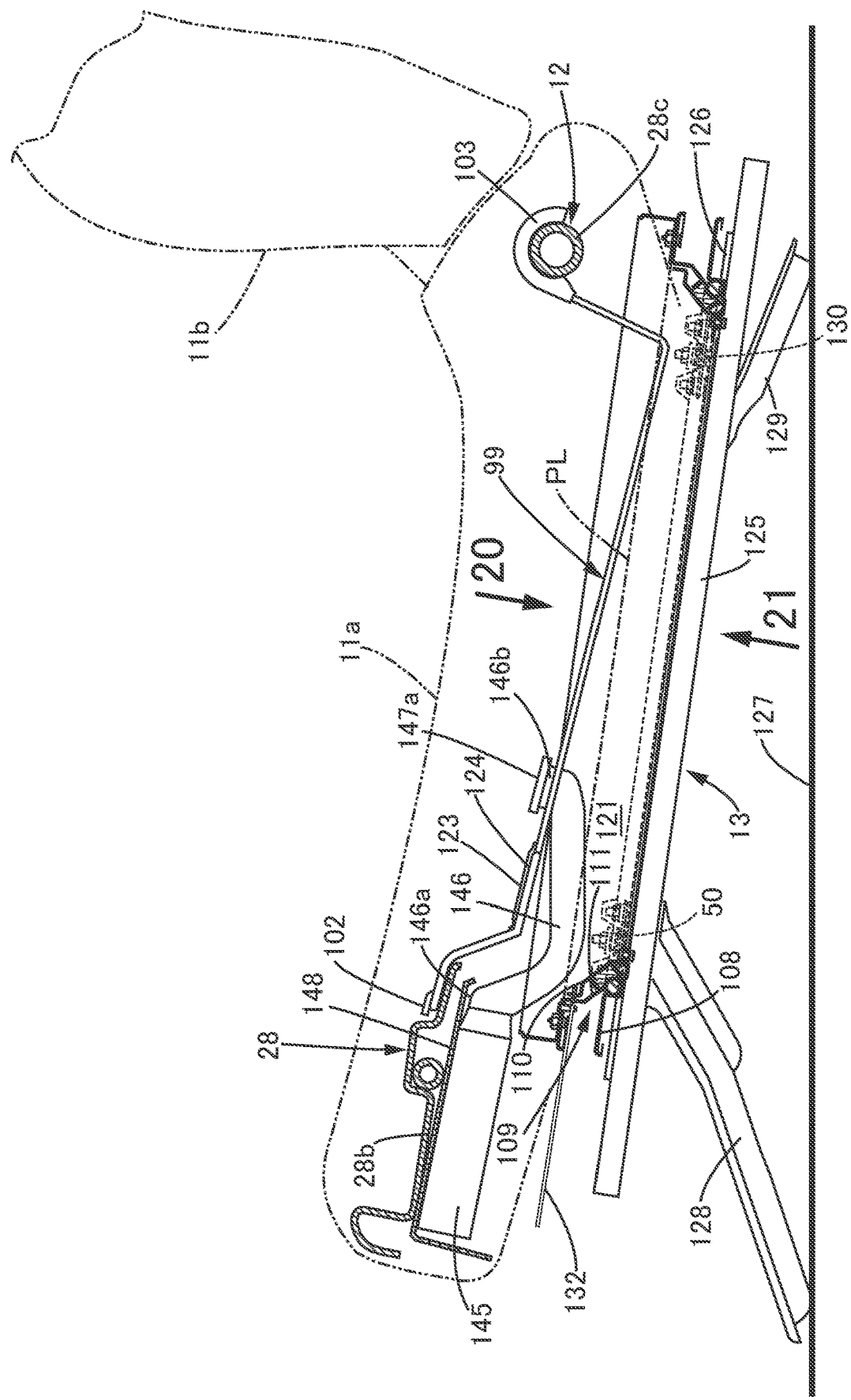
FIG. 19 is a sectional view along line 19-19 in FIG. 18. (sixth embodiment)
Figure 20:
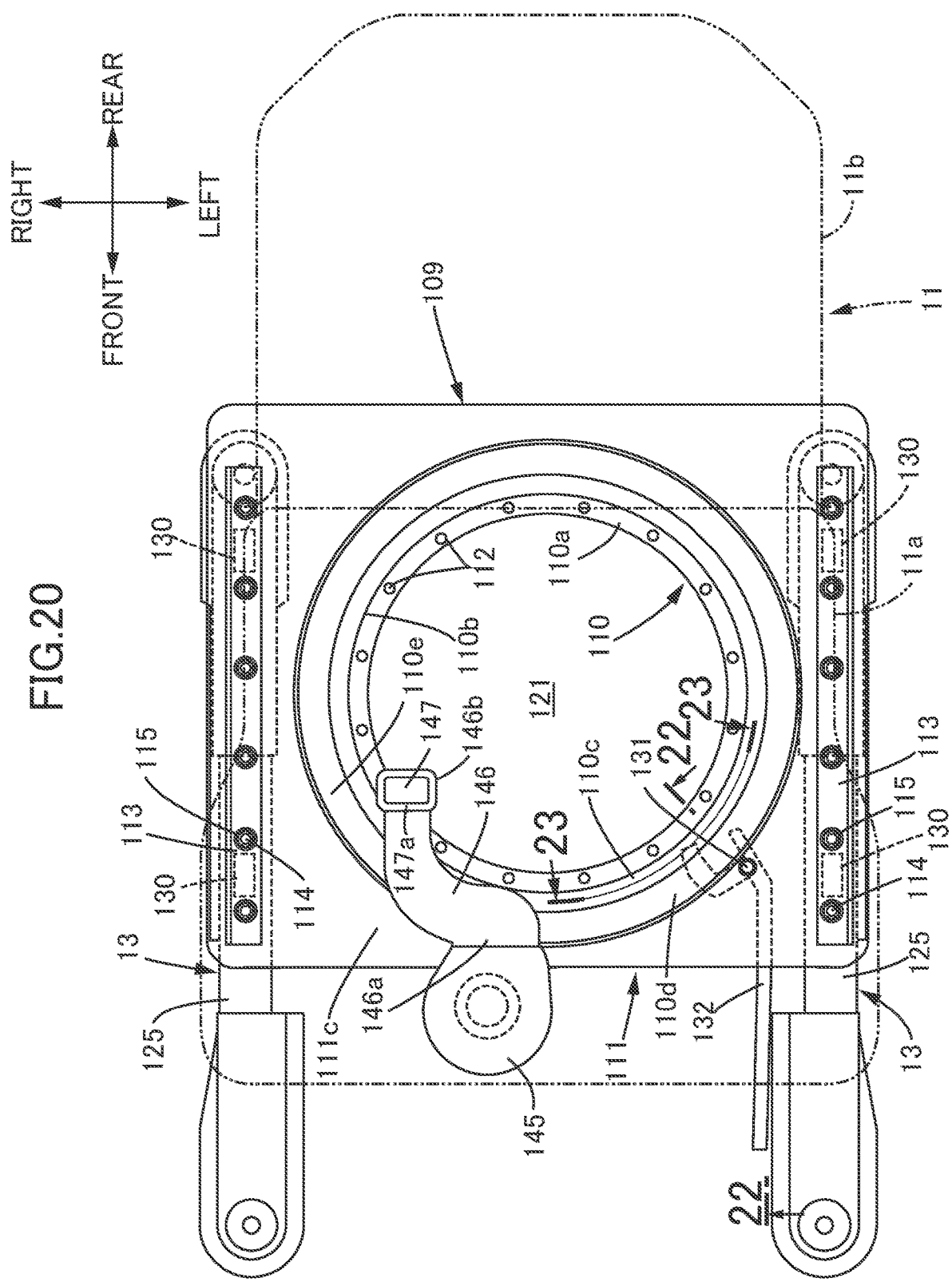
FIG. 20 is a view of a slide rail and the rotation mechanism when viewed from the direction of arrow 20 in FIG. 19. (sixth embodiment)
Figure 21:
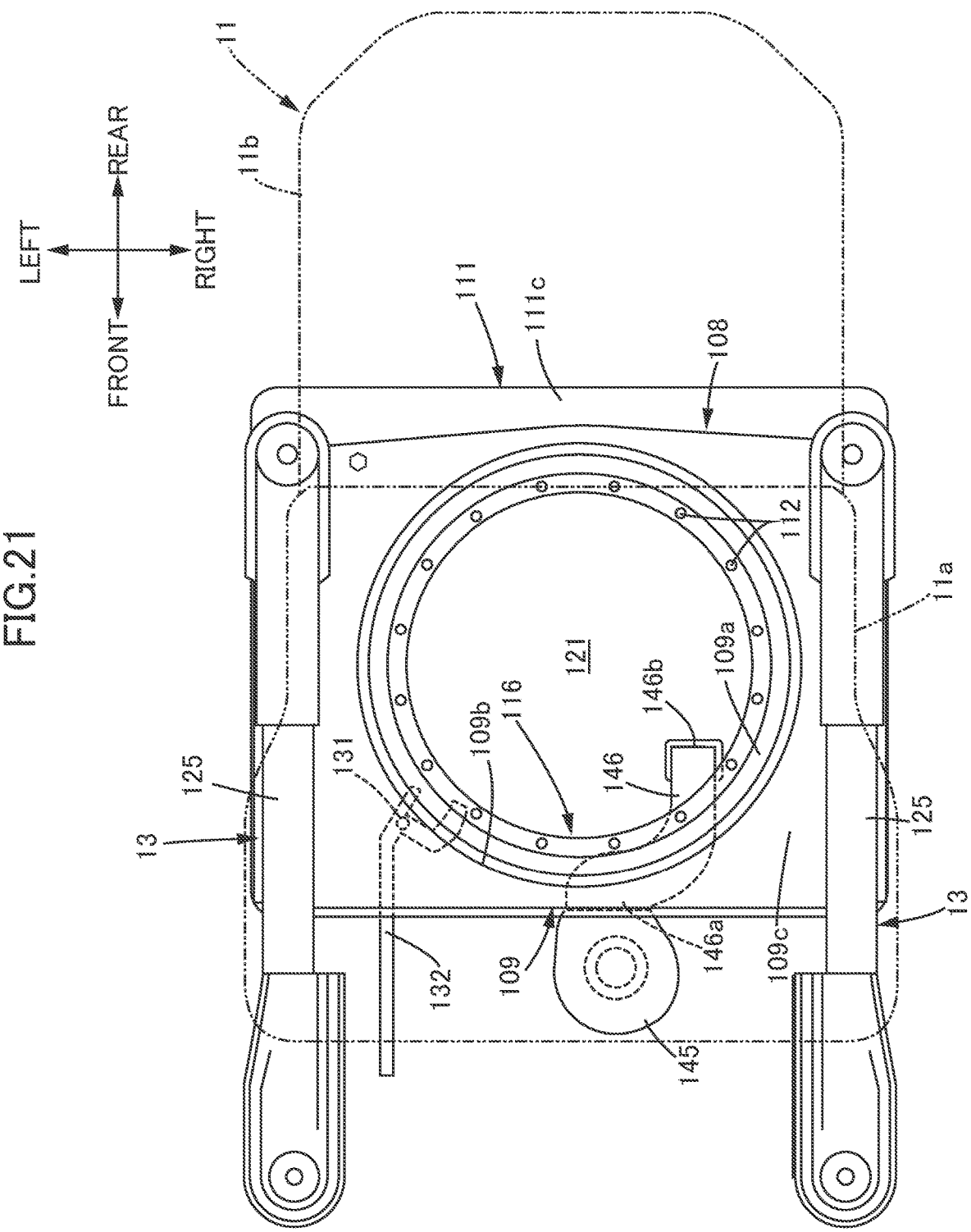
FIG. 21 is a view of the slide rail and the rotation mechanism when viewed from the direction of arrow 21 in FIG. 19. (sixth embodiment)
Figure 22:
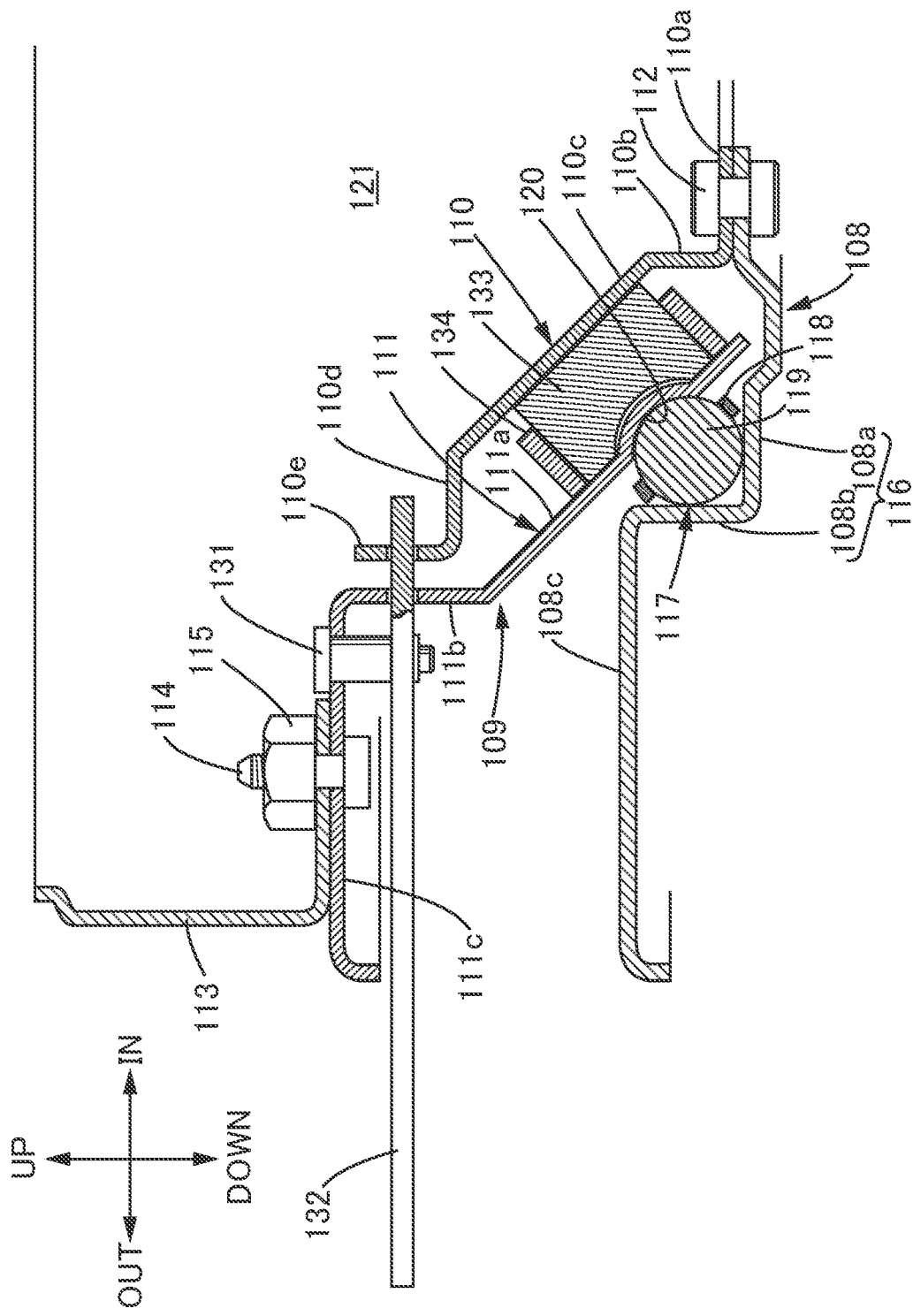
FIG. 22 is a sectional view along line 22-22 in FIG. 20. (sixth embodiment)

The cushion-side pressure-receiving member 99 is mounted on the seat cushion frame 28 of the seat frame 12 so that the lowest end part of the cushion-side pressure-receiving member 99 does not abut against the fourth seat-rotating device 109, and when an occupant is seated on the seat cushion 11a, as shown by the double-dotted broken line in FIG. 19 the cushion-side pressure-receiving member 99 is mounted on the seat cushion frame 28 so as to avoid abutting against the fourth seat-rotating device 109.

A seat sensor 123 for detecting whether an occupant is seated on the seat cushion 11a is mounted on the cushion-side pressure-receiving member 99, and the seat sensor 123 is mounted on a sensor mounting part 124 provided on the cushion-side pressure-receiving member 99 so as to be disposed at a position where the sensor mounting part 124 does not overlap the fourth annular rotating member 111 in plan view. In this embodiment, the sensor mounting part 124 is provided on the cushion-side pressure-receiving member 19 in the vicinity of the pan frame 28b of the seat cushion frame 28.

The slide rail 13 is formed from a fixed rail 125 that extends in the vehicle fore-and-aft direction, and a movable rail 126 that is slidably fitted to the fixed rail 125, a front part of the fixed rail 125 along the vehicle fore-and-aft direction is fixed to a vehicular floor face 127 via a front bracket 128, and a rear part of the fixed rail 125 is fixed to the floor face 127 via a rear bracket 129. Moreover, the front bracket 128 is formed so as to be higher than the rear bracket 129, and the fixed rail 125, that is, the slide rail 13, extends in the vehicle fore-and-aft direction in an inclined manner so as to be lower in going rearward in the vehicle fore-and-aft direction.

The load of an occupant seated on the seat cushion 11a is detected by a load sensor 130, the load sensor 130 being disposed at a position where it avoids overlapping the seat sensor 123 in plan view, and in this embodiment it is provided at four locations between front and rear parts of the movable rail 126 forming part of the pair of left and right slide rails 13 and front and rear end parts on the left and right of the eighth collar portion 111c of the fourth annular rotating member 111r.

Referring in addition to FIG. 23, it is possible to switch between a locked state and release of the locked state of the fourth annular rotating member 111 with respect to the fourth base member 108 and the fourth support member 110 by operation of a third lock member 132 supported on the fourth annular rotating member 111, and a fifth rattle-suppressing member 133 that operates in association with operation of the third lock member 132 is disposed between the fourth support member 110 and the fourth annular rotating member 111.

A tapered third pushing-out member 134 whose diameter increases in going upward is disposed between the eighth taper portion 110c of the fourth support member 110 and the ninth taper portion 111a of the fourth annular rotating member 111. A housing hole 135 extending lengthwise in the peripheral direction of the third pushing-out member 134 is provided at a plurality of locations spaced in the peripheral direction of the third pushing-out member 134, and the fifth rattle-suppressing member 133 disposed between the eighth taper portion 110c of the fourth support member 110 and the ninth taper portion 111a of the fourth annular rotating member 111 is housed in the housing hole 135.

On the other hand, the third lock member 132 is pivotably supported on the fourth annular rotating member 111 via a shaft 131 having a vertical axis, and the third lock member 132 can pivot between a locked position in which as shown in FIG. 23 (a) it engages with the eighth taper portion 110c of the fourth support member 110 so as to prevent the fourth annular rotating member 111 from rotating and a lock release position in which as shown in FIG. 23 (b) the engagement with the eighth taper portion 110c is released so as to allow the fourth annular rotating member 111 to rotate, the third lock member 132 being pivotingly urged toward the locked position side by means of a spring 136.

A link arm portion 132a of the third lock member 132 is inserted through a through hole 137 formed in the ninth taper portion 111a of the fourth annular rotating member 111, an extremity part of the link arm portion 132a can be inserted through a linking hole 138 formed in the third pushing-out member 134, and inserting the extremity part of the link arm portion 132a through the linking hole 138 links the third lock member 132 to the third pushing-out member 134. As shown in FIG. 23 (b), the link arm portion 132a is linked to the linking hole 138 when the third lock member 132 attains the lock release position, and a pressing force in the pivoting direction acts on the third pushing-out member 134 from the link arm portion 132a.

At the locked position shown in FIG. 23 (a), an engagement arm portion 132b of the third lock member 132 engages with a fifth through hole 139 formed in the ninth taper portion 111a of the fourth annular rotating member 111 and a sixth through hole 140 formed in the eighth taper portion 110c of the fourth support member 110, but at the lock release position shown in FIG. 23 (b) it disengages from the sixth through hole 140 so as to release the engagement with the fourth support member 110, and the engagement arm portion 132b operates so as to straddle the third pushing-out member 134 between the locked position and the lock release position.

Formed in the ninth taper portion 111a of the fourth annular rotating member 111 is a recess part 141 housing part of the fifth rattle-suppressing member 133, the fifth rattle-suppressing member 133 being capable of being closely fitted into the recess part 141.

The fifth rattle-suppressing member 133 is formed into a wedge shape so as to have an inclined face 133a whose height gradually decreases in going in the direction of movement 62 of the third pushing-out member 134 in response to the third lock member 132 operating from the lock release position toward the locked position side, and the recess part 141, which enables the fifth rattle-suppressing member 133 to be closely fitted thereinto, is formed into a triangular shape housing part of the fifth rattle-suppressing member 133 while having a recess part-side inclined face 141a opposing the inclined face 133a.

Furthermore, a coil spring 143 is provided in a compressed state between the fifth rattle-suppressing member 133 and, among opposite end parts in the longitudinal direction of the housing hole 135 formed in the third pushing-out member 134, a front end part along the direction of movement 142, and the fifth rattle-suppressing member 133 is urged in a direction opposite to the direction of movement 62 by virtue of a spring force exhibited by the coil spring 143.

When the third lock member 132 is at the locked position, as shown in FIG. 23 (a), the inclined face 133a of the fifth rattle-suppressing member 133 abuts closely against the recess part-side inclined face 141a of the recess part 141, thus putting the fifth rattle-suppressing member 133 in close contact with the fourth annular rotating member 111 and the fourth support member 110 and thereby preventing the fourth annular rotating member 111 from rattling.

When the third lock member 132 attains the lock release position, as shown in FIG. 23 (b), among the opposite end parts in the longitudinal direction of the housing hole 135, the rear end part along the direction of movement 142 abuts against the fifth rattle-suppressing member 133, the fifth rattle-suppressing member 133 is pushed in the direction of movement 142 against the urging force of the coil spring 143, and the fifth rattle-suppressing member 133 moves toward the side on which the inclined face 133a of the fifth rattle-suppressing member 133 moves away from the recess part-side inclined face 141a, thus releasing the rattle-preventing state.

A blower 145 is disposed further inside than the outer periphery of the seat cushion frame 28 in plan view, in this embodiment further rearward than the front edge of the pan frame 28b forming a front part of the seat cushion frame 28. One end portion 146a of a duct 146 is connected to the blower 145, and an opening 147 is formed in the other end portion 146*b* as a blower outlet.

The blower 145 is mounted on a lower part of the pan frame 28*b* via a mounting member 148, and at least part of the opening 147 (a front part in this embodiment) is disposed on the radially inner side of the fourth annular rotating member 111 in plan view and on the radially inner side of the fourth support member 110. Moreover, the opening 147 opens toward the seat cushion 11*a* side, and is disposed between, among the plurality of seat springs 100 forming the cushion-side pressure-receiving member 99, a pair of mutually adjacent seat springs 100 in plan view as clearly shown in FIG. 18.

The other end portion 146*b* of the duct 146 protrudes slightly upward from the cushion-side pressure-receiving member 99, and an upper end opening edge 147*a* the opening 147 is disposed above the fourth annular rotating member 111 when viewed from the side. That is, as shown in FIG. 19, the upper end opening edge 147*a* of the opening 147 is disposed above a virtual plane PL passing through an upper face of the eighth collar portion 111*c* of the fourth annular rotating member 111.

At least part of the duct 146 is housed in the circular housing part 121, which the fourth annular rotating member 111 has as its central part. In this embodiment, the one end portion 146*a* of the duct 146 is connected to the blower 145 above the upper end of the fourth annular rotating member 111, that is, above the virtual plane PL so as to overlap the fourth annular rotating member 111 in plan view, and at least an intermediate part (the intermediate part in this embodiment) of the duct 146 is disposed so as to overlap the fourth annular rotating member 111 when viewed from the side and is housed in the housing part 121.

Figure 24:
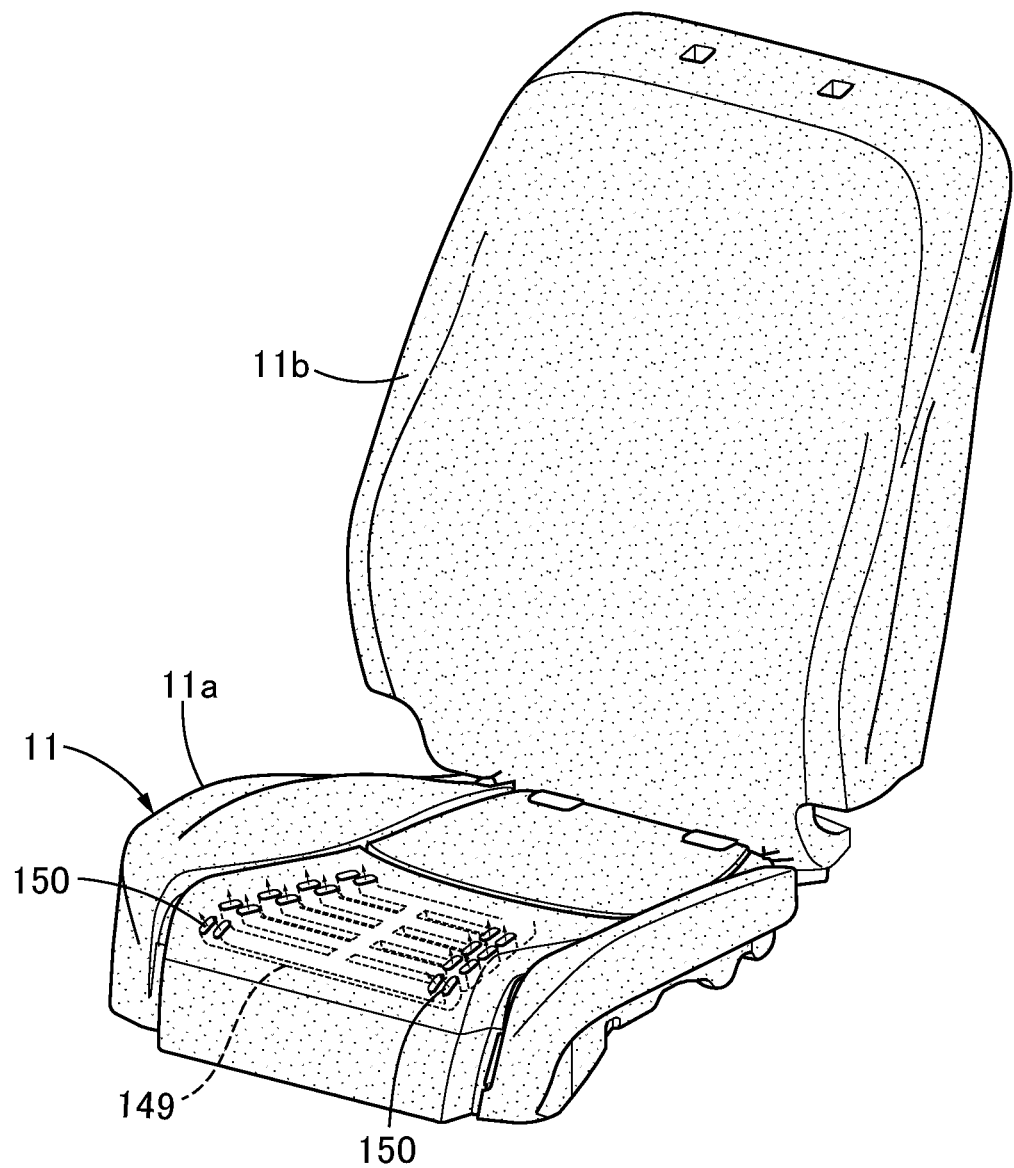
FIG. 24 is a perspective view of a seat cushion and a seat back. (sixth embodiment)

In FIG. 24, the seat cushion 11*a* is formed by wrapping a plurality of layered pads with a skin material, and a passage 149 through which air blown out via the opening 147 of the duct 146 flows is formed between the plurality of pads, a breather hole 150 communicating with the passage 149 being formed in the pad on the surface layer, and air travels through the skin material via the breather hole 150 and is blown out from the seat face.

The operation of the sixth embodiment is now explained. Since the fourth seat-rotating device 109 has the fourth annular rotating member 111 having the seat cushion frame 28 mounted thereon and the fourth base member 108 rotatably supporting the fourth annular rotating member 111, the one end portion 146*a* of the duct 146 having the opening 147 as a blower outlet is connected to the blower 145 disposed further inside than the outer periphery of the seat cushion frame 28 in plan view, and at least part of the opening 147 is disposed on the radially inner side of the fourth annular rotating member 111 in plan view, it is possible to form the vehicular seat device, which includes the blower 145 and the duct 146, in a compact manner and it is possible to make the relative placement of the opening 147 of the duct 146 and the fourth annular rotating member 111 compact.

Since at least the inside portion along the radial direction of the fourth annular rotating member 111 is sandwiched between the fourth base member 108 and the fourth support member 110 formed into an annular shape and having at least part thereof fixedly disposed above the fourth base member 108, and the opening 147 is disposed on the radially inner side of the fourth support member 110 in plan view, even when the arrangement is such that at least the inside portion along the radial direction of the fourth annular rotating member 111 is covered with the fourth support member 110, it is possible to dispose the opening 147 while avoiding interference with the fourth support member 110.

Furthermore, since the upper end opening edge 147*a* of the opening 147 is disposed above the fourth annular rotating member 111 when viewed from the side, it is possible to dispose the opening 147 on the side closer to an occupant while avoiding interference with the fourth annular rotating member 111.

Moreover, since the fourth annular rotating member 111 is formed so as to have in its central part the circular housing part 121 opening at least upward, and at least part of the duct 146 is housed in the housing part 121, at least part of the duct 146 is disposed at a position where it overlaps the fourth annular rotating member 111 when viewed from the side, and it is possible to suppress any increase in the size in the vertical direction of the vehicular seat device.

Furthermore, since the one end portion 146*a* of the duct 146 is connected to the blower 145 above the upper end of the fourth annular rotating member 111, and at least the intermediate part of the duct 146 is disposed so that it overlaps the fourth annular rotating member 111 when viewed from the side, it is possible to suppress any increase in the size in the vertical direction of the vehicular seat device.

Moreover, since the one end portion 146*a* of the duct 146 is connected to the blower 145 at a position where it overlaps the fourth annular rotating member 111 in plan view, it is possible to dispose the blower 145 closer to the fourth annular rotating member 111, thus making the vehicular seat device compact in the radial direction of the annular fourth annular rotating member 111.

Furthermore, since the cushion-side pressure-receiving member 99, which receives a load from above the seat cushion 11*a*, is stretched between the pan frame 28*b* and the rear pipe 28*c* of the seat cushion frame 28 while having the plurality of seat springs 100 formed by curving a metal wire into a zig-zag, the blower 145 is mounted on a lower part of the pan frame 28*b* via the mounting member 148, and the opening 147 opening toward the seat cushion 11*a* side is disposed between the seat springs 100 in plan view, it is possible to facilitate mounting of the blower 145 on the seat cushion frame 28, to prevent the cushion-side pressure-receiving member 99 from affecting the flow of air in the opening 147 of the duct 146, and to enhance visibility from above of the cushion-side pressure-receiving member 99 when checking the state in which the duct 146 is mounted.

Moreover, since the passage 149, through which air blown out from the opening 147 as a blower outlet flows, is formed in the seat cushion 11*a*, it is possible to blow out air from the seat face of the seat cushion 11*a*.

Furthermore, since the cushion-side pressure-receiving member 99 mounted on the seat frame 12 so as to receive a load from above the seat cushion 11*a* is mounted on the seat frame 12 so that at least part thereof is present at a position where it overlaps the fourth annular rotating member 111 when viewed from the side, it is possible to dispose the fourth seat-rotating device 109 and the cushion-side pressure-receiving member 19 compactly in the vertical direction.

Moreover, since the circular housing part 121 opening upward is formed in a central part of the fourth annular rotating member 111 forming part of the fourth seat-rotating device 109, and at least part of the cushion-side pressure-receiving member 99 is housed in the housing part 121 so that it is present at a position where it overlaps the fourth annular rotating member 111 when viewed from the side, it is possible, by utilizing effectively an empty space of the central part of the fourth annular rotating member 111, to dispose the fourth seat-rotating device 109 and the cushion-side pressure-receiving member 99 compactly in the vertical direction.

Furthermore, since the cushion-side pressure-receiving member 99 is mounted on the seat frame 12 so as to avoid abutment between the fourth seat-rotating device 109 and the lowest end part of the cushion-side pressure-receiving member 99, it is possible to prevent the cushion-side pressure-receiving member 99 and the fourth seat-rotating device 109 from interfering with each other. In particular, since the cushion-side pressure-receiving member 99 is mounted on the seat frame 12 so as to avoid abutment between the cushion-side pressure-receiving member 99 and the fourth seat-rotating device 109 in a state in which an occupant is seated on the seat cushion 11a, it is possible to prevent the cushion-side pressure-receiving member 99 and the fourth seat-rotating device 109 from interfering with each other even in a state in which a load due to an occupant being seated acts on the cushion-side pressure-receiving member 99.

Moreover, since the seat frame 12 includes the pair of side frames 28a extending linearly so as to be arranged at positions spaced from each other and fixedly disposed on the fourth annular rotating member 111, and the cushion-side pressure-receiving member 99 is disposed between the pair of side frames 28a in plan view, it is possible to avoid any increase in the size in the radial direction due to the disposition of the cushion-side pressure-receiving member 99.

Furthermore, since the seat sensor 123 for detecting a state in which an occupant is seated on the seat cushion 11a is mounted on the sensor mounting part 124 provided on the cushion-side pressure-receiving member 99 at a position where the sensor mounting part 124 does not overlap the fourth annular rotating member 109 in plan view, it is possible to make it easy to check that the seat sensor 123 is mounted on the sensor mounting part 124 while avoiding any increase in the size of the vehicular seat device in the radial direction due to the disposition of the seat sensor 123.

Moreover, since the load sensor 130 for detecting the load of an occupant seated on the seat cushion 11a is disposed at a position that avoids the load sensor 130 overlapping the seat sensor 123 in plan view, it is possible to prevent the load sensor 130 and the seat sensor 123 from overlapping each other in the vertical direction, thus making the vehicular seat device more compact in the vertical direction, and an improvement of the visibility of the load sensor 130 and the seat sensor 123 can be anticipated.

Seventh Embodiment

Figure 25:
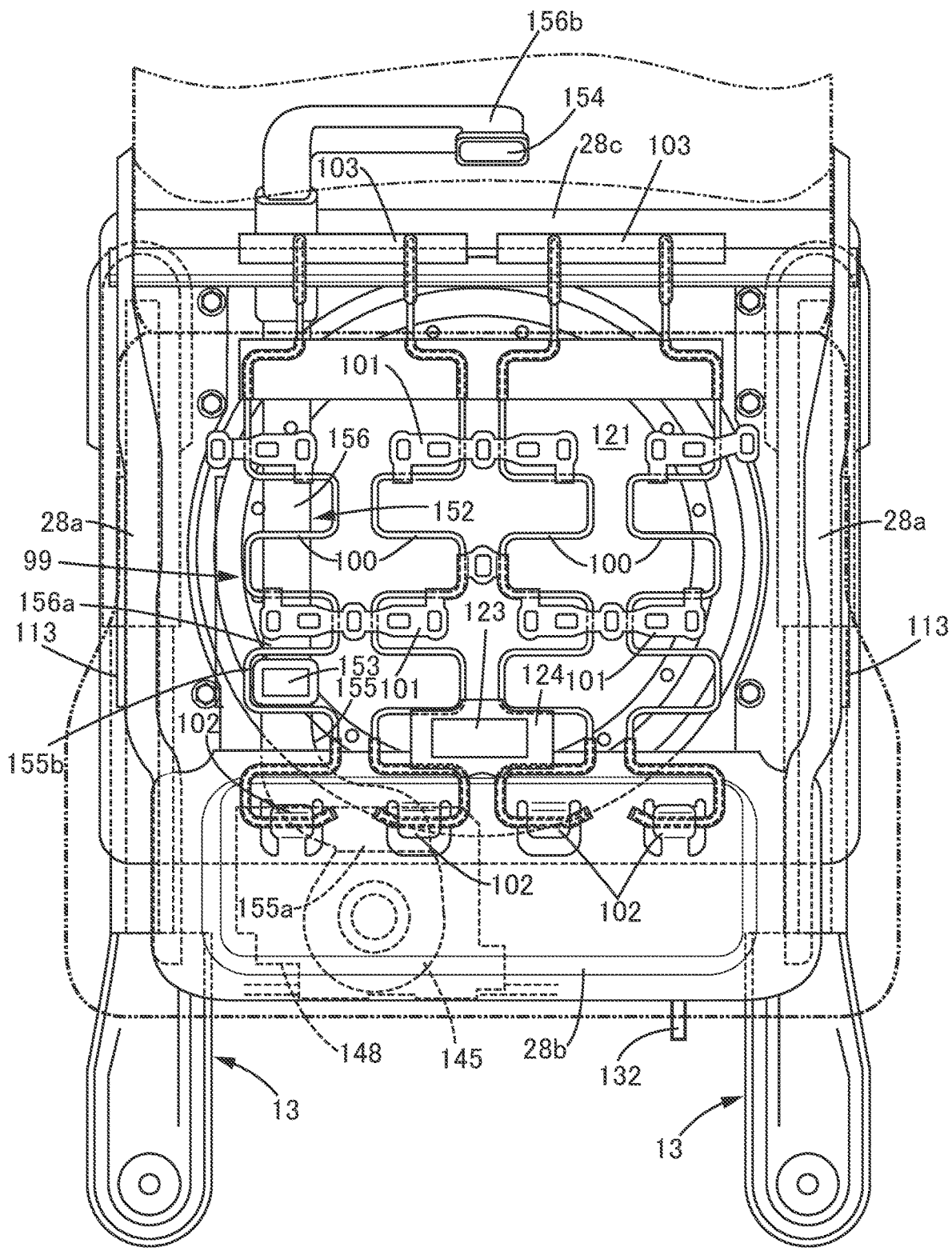
FIG. 25 is a plan view, corresponding to FIG. 18, of a seventh embodiment. (seventh embodiment)

A seventh embodiment of the present invention is explained by reference to FIG. 25 and FIG. 26; parts corresponding to those of the first to sixth embodiments are denoted by the same reference numerals and symbols and are only illustrated, detailed explanation thereof being omitted.

The blower 145 is disposed further rearward than the front edge of the pan frame 28b forming the front part of the seat cushion frame 28, and a duct 152 is connected to the blower 145.

The duct 152 is formed so as to have a duct main part 155 having one end portion 155a connected to the blower 145 and having in the other end portion 155b a first opening 153 opening toward the seat cushion 11a side and having at least part thereof disposed on the radially inner side of the fourth annular rotating member 111, and a duct branched part 156 having a second opening 154 opening toward the seat back 11b disposed above a rear part of the seat cushion 11a and branching from the duct main part 155.

The first opening 153 opens toward the seat cushion 11a side as in the sixth embodiment, and is disposed in plan view between a pair of mutually adjacent seat springs 100 among the plurality of seat springs 100 forming the cushion-side pressure-receiving member 99.

One end portion 156a of the duct branched part 156 is connectedly provided on the duct main part 155 in the vicinity of the first opening 153, extends rearward from the duct main part 155, and further extends to the rear of the seat back 11b, the second opening 154 being formed in the other end portion 156b of the duct branched part 156. At least part of the duct branched part 156 (part in this embodiment) is, as shown in FIG. 25, disposed on the radially inner side of the fourth annular rotating member 111 in plan view.

Figure 26:
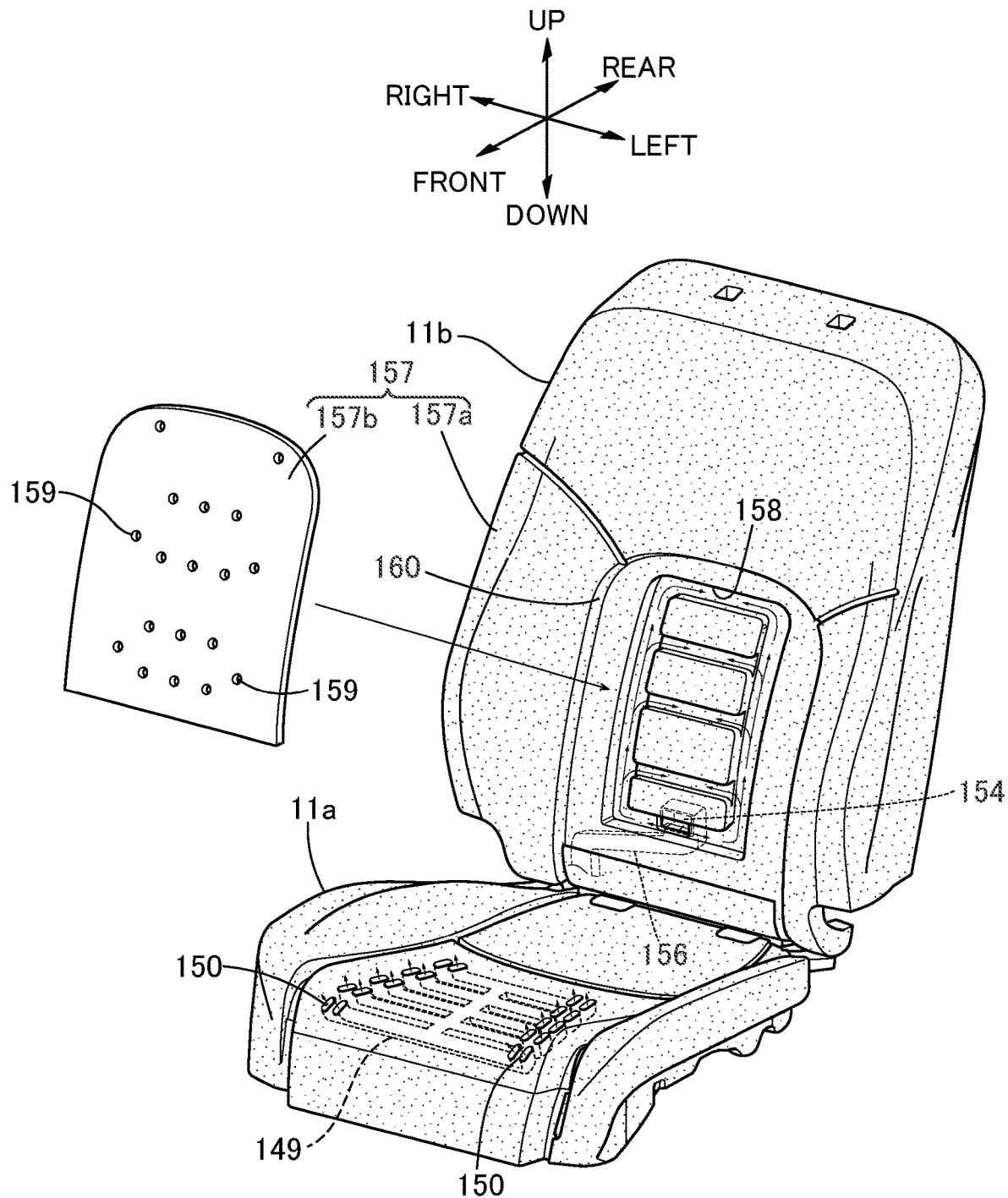
FIG. 26 is a perspective view of a seat cushion and a seat back. (seventh embodiment)

Referring to FIG. 26, the seat back 11b is formed by wrapping a seat back pad 157 with a skin material; the seat back pad 157 includes a pad main body 157a and a surface layer pad 157b fitted into a recess part 160 formed in the pad main body 157a, a groove forming between itself and the surface layer pad 157b a passage 158 communicating with the second opening 154 as a blower outlet is formed in the pad main body 157a, and a plurality of breather holes 159 communicating with the passage 158 are formed in the surface layer pad 157b.

In accordance with the seventh embodiment, since the duct 152 is formed so as to have the duct main part 155, which has the one end portion 155a connected to the blower 145 and has in the other end portion 155b the first opening 153 opening toward the seat cushion 11a side and having at least part hereof disposed on the radially inner side of the fourth annular rotating member 111, and the duct branched part 156, which has the second opening 154 opening toward the seat back 11b disposed above the rear part of the seat cushion 11a and branches from the duct main part 155, it is possible to compactly form an air conditioning mechanism that can be applied to either of the seat cushion 11a and the seat back 11b.

Furthermore, since part of the duct branched part 156 is disposed on the radially inner side of the fourth annular rotating member 111 in plan view, it is possible to compactly dispose the duct branched part 156.

In the arrangement disclosed by Japanese Patent Application Laid-open No. 2010-173491 cited as Patent Document 1, a pair of front and rear mounting brackets (corresponding to the base member of the invention of the present application) forming part of a rotation mechanism are stretched between upper rails (corresponding to the movable rail of the invention of the present application) of a pair of left and right slide rails so as to join opposite end parts of the mounting brackets to the outside faces of the upper rails. Because of this, the opposite end parts of the mounting brackets protrude outward from the upper rails, thus causing an increase in the size of the seat-rotating device. Therefore, an eighth embodiment that enables the base member to have a small size, and consequently the seat-rotating device to have a small size, is now explained.

Eighth Embodiment

Figure 27:
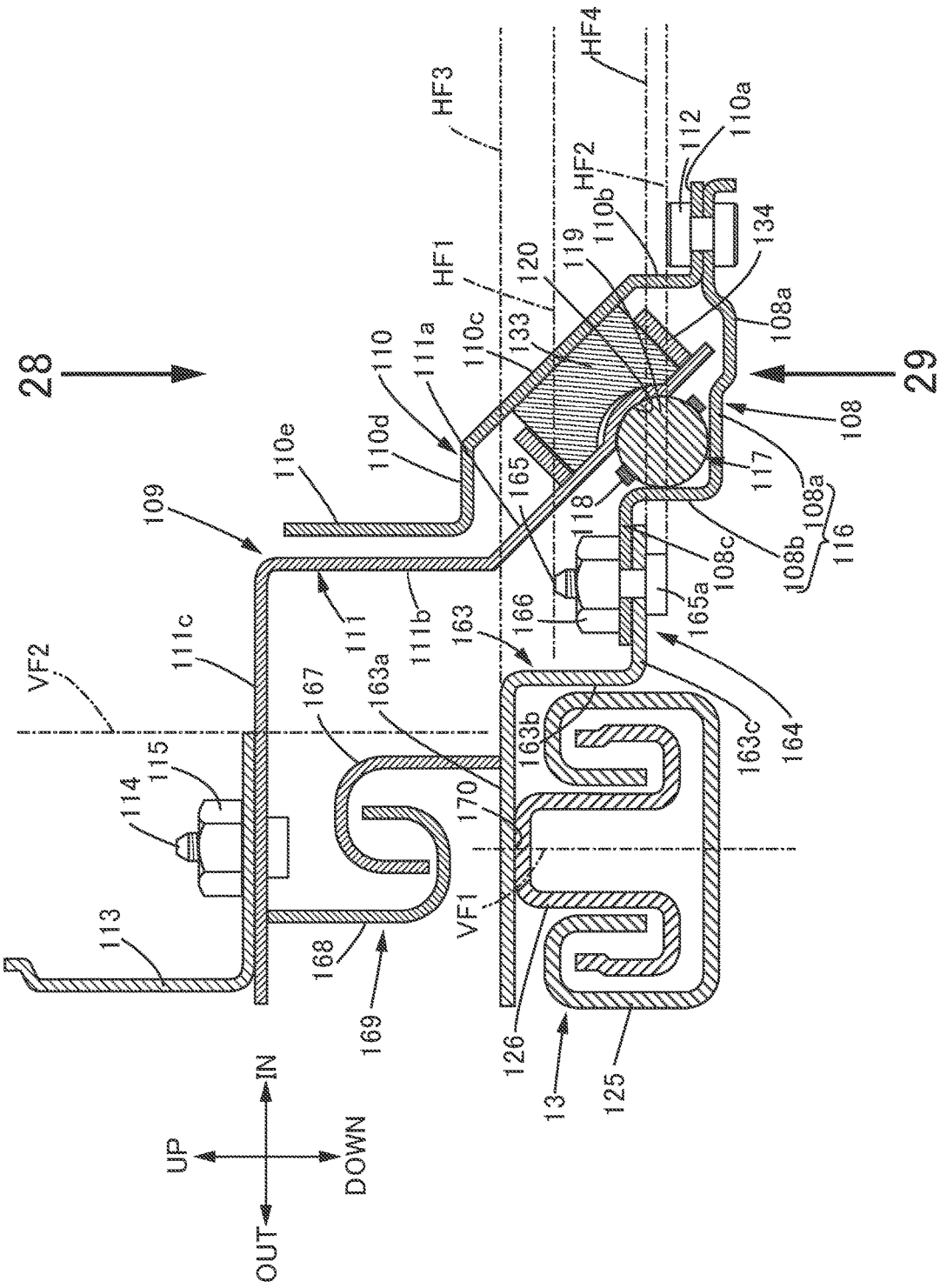
FIG. 27 is a sectional view, corresponding to FIG. 22, of an eighth embodiment. (eighth embodiment)
Figure 28:
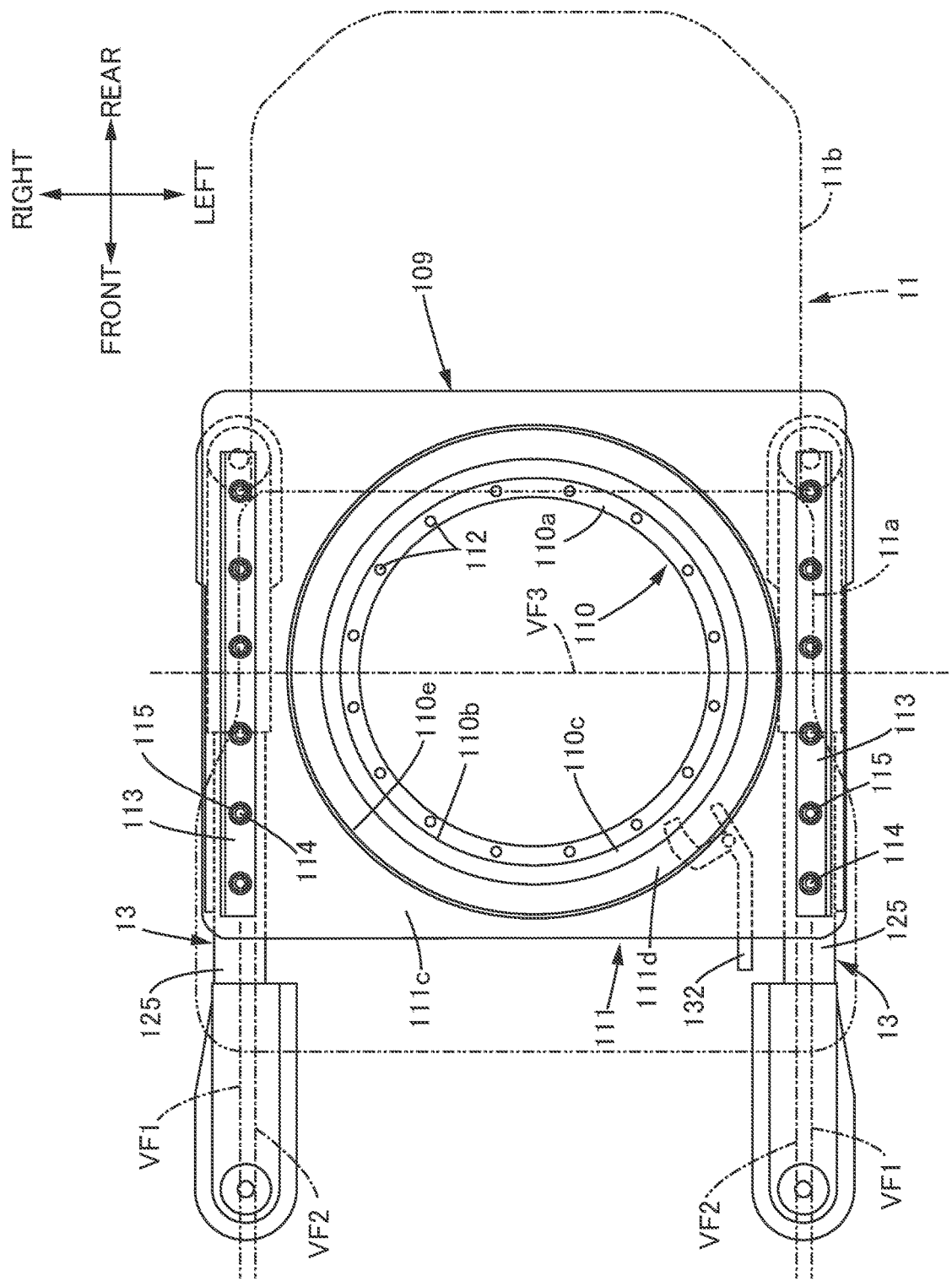
FIG. 28 is a view in the direction of arrow 28 in FIG. 27. (eighth embodiment)
Figure 29:
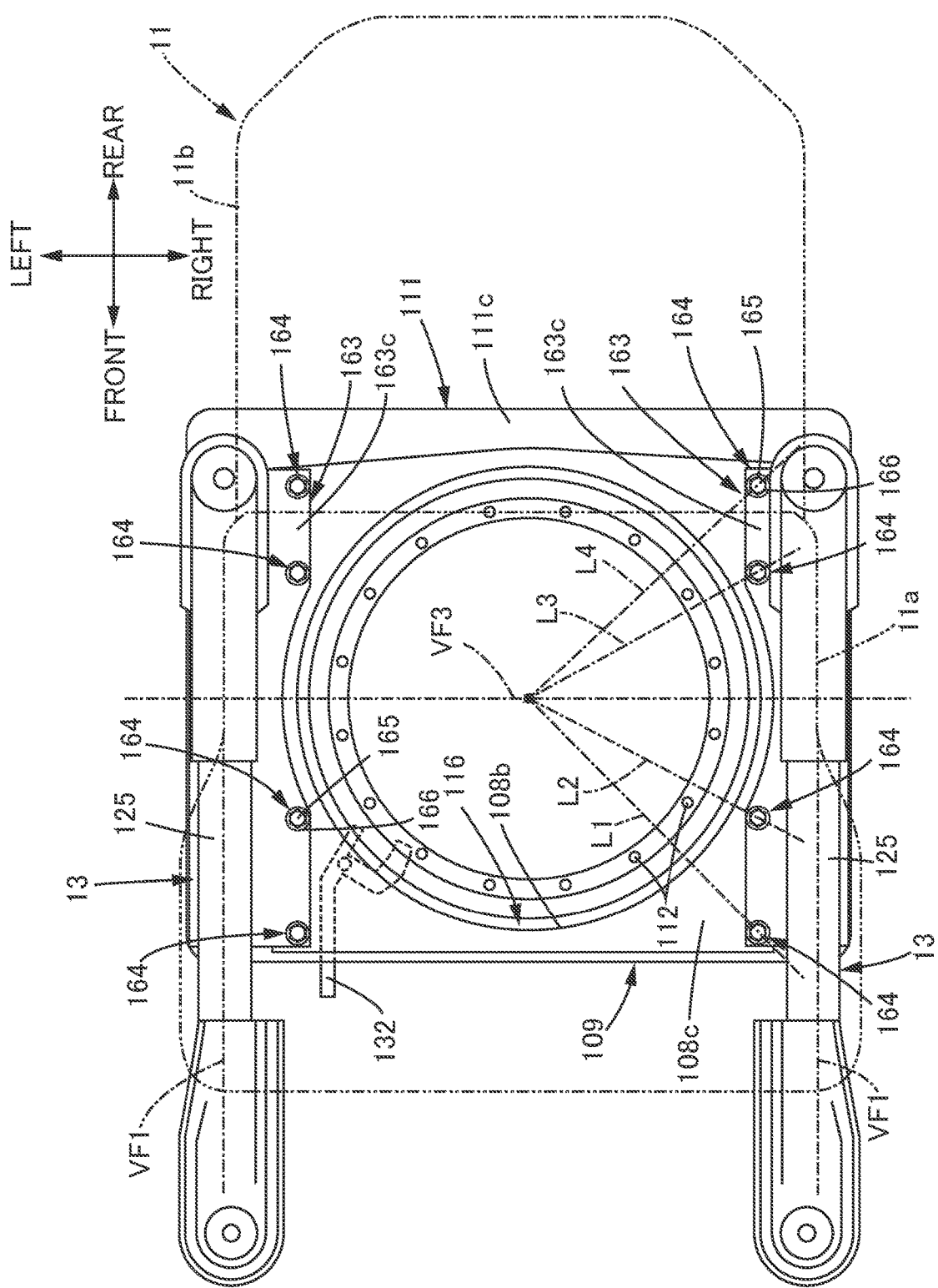
FIG. 29 is a view in the direction of arrow 29 in FIG. 27. (eighth embodiment)

The eighth embodiment of the present invention is explained by reference to FIG. 27 to FIG. 29; parts corresponding to those of the sixth embodiment shown in FIG. 18 to FIG. 24 are denoted by the same reference numerals and symbols and are only illustrated, detailed explanation thereof being omitted.

The fourth base member 108 forming part of the fourth seat-rotating device 109 is disposed beneath the cushion-side pressure-receiving member 99 (see sixth embodiment) further on the inside than a middle part in the width direction of the pair of slide rails 13 in plan view. That is, the fourth base member 108 is disposed between a pair of left and right straight lines VF1 passing through the middle part in the width direction of the pair of slide rails 13 and extending in the vehicle fore-and-aft direction.

Connectedly provided on the movable rail 126 in the slide rail 13 is a support bracket 163 extending to the inside of the pair of slide rails 13 and formed integrally with or separately from the movable rail 126 (separately in this embodiment), the fourth base member 108 being linked to the support bracket 163 via linking means 164.

In this embodiment, the linking means 164 is formed from a third bolt 165 inserted through the support bracket 163 and the fourth base member 108 from below and a third nut 166 screwed onto the third bolt 165.

A first hook member 167 is fixed onto the movable rail 126 or the support bracket 163 (the support bracket 163 in this embodiment), and a second hook member 168 is fixed to the fourth annular rotating member 111 and is engaged with the first hook member 167 so as to allow the fourth annular rotating member 111 to rotate, the second hook member 168 forming, in cooperation with the first hook member 167, a deformation-suppressing mechanism 169 that suppresses upward lifting of the fourth annular rotating member 111 with respect to the movable rail 126.

The first hook member 167 is fixed to the support bracket 163 at a total of four locations corresponding respectively to front end parts and rear end parts of the pair of left and right movable rails 126 at a position where overlapping with the linking means 164 in plan view is avoided. The second hook member 168 is fixed to four locations corresponding to the first hook members 167 on a lower face of the eighth collar portion 111c of the fourth annular rotating member 111.

The linking means 164 is disposed at a lower position in the vertical direction than the deformation-suppressing mechanism 169 and at a lower position in the vertical direction than a part, connected to the movable rail 126, of the support bracket 163, which is separate from the movable rail 126.

That is, in this embodiment, the support bracket 163 is formed so as to integrally have a flat plate-shaped mounting plate portion 163a disposed on the movable rail 126 so that its lower face is fixed to the movable rail 126 by welding, etc., a side-plate portion 163b extending in the vertical direction at a position adjacent to the inside of the pair of slide rails 13 and connected to the mounting plate portion 163a at right angles, and a flat plate-shaped linking plate portion 163c extending from the lower end of the side-plate portion 163b toward the side opposite to the slide rail 13 and abutting against the seventh collar portion 108c of the fourth base member 108 from below. A lower end part of the first hook member 167 is fixed to an upper face of the mounting plate portion 163a, and the third bolt 165 of the linking means 164 is inserted through the linking plate portion 163c and the seventh collar portion 108c so as to make an enlarged diameter head portion 165a abut against a lower face of the linking plate portion 163c.

The first hook member 167 of the deformation-suppressing mechanism 169 is fixed to the upper face of the mounting plate portion 163a of the support bracket 163, and a fixed portion 170 of the mounting plate portion 163a that is fixed to the movable rail 126 is disposed at a position where it overlaps the first hook member 167 in plan view.

The linking means 164 is disposed at a position adjacent to the pair of slide rails 13 from the inside in the direction in which the slide rails 13 are arranged side by side, that is, the left-and-right direction, and the third bolt 165 of the linking means 164 is inserted through the linking plate portion 163c and the seventh collar portion 108c at a position close to the side-plate portion 163b, which is present at a position adjacent to the slide rail 13 from the inside. Moreover, at least part of the linking means 164 is disposed at a position where it overlaps the slide rail 13 when viewed from the side in a direction orthogonal to the longitudinal direction of the slide rail 13, and in this embodiment the entirety of the linking means 164 overlaps the slide rail 13 when viewed from the side in a direction orthogonal to the longitudinal direction of the slide rail 13.

The linking means 164 is disposed on at least one side of a third virtual vertical face VF3 that passes through the center of the rotation support part 116 and is orthogonal to the pair of slide rails 13, and in this embodiment the linking means 164 is disposed at two locations spaced in the fore-and-aft direction on the front side of the third virtual vertical face VF3 and two locations spaced in the fore-and-aft direction on the rear side of the third virtual vertical face VF3.

Moreover, in plan view, the linking means 164 disposed at the two locations spaced in the fore-and-aft direction on the front side of the third virtual vertical face VF3 are positioned between the slide rail 13 and the rotation support part 116 and fourth annular rotating member 111 on first and second imaginary straight lines L1, L2 passing through central parts of the rotation support part 116 and the fourth annular rotating member 111 and a central part of the linking means 164, that is, central parts of the third bolt 165 and the third nut 166. In plan view, the linking means 164 disposed at the two locations spaced in the fore-and-aft direction on the rear side of the third virtual vertical face VF3 are positioned between the slide rail 13 and the rotation support part 116 and the fourth annular rotating member 111 on third and fourth imaginary straight lines L3, L4 passing through the central parts of the rotation support part 116 and the fourth annular rotating member 111 and the central part of the linking means 164.

Furthermore, the linking means 164 is set so that at least part (the entirety in this embodiment) thereof overlaps the fourth annular rotating member 111 when viewed from the side in a direction orthogonal to the longitudinal direction of the slide rail 13. That is, a first virtual horizontal face HF1 passing through the upper end of the linking means 164 and a second virtual horizontal face HF2 passing through the lower end of the linking means 164 are set so that they transect the fourth annular rotating member 111.

The vertical position of the support bracket 163 is set so that it overlaps part of the fourth annular rotating member 111 when the support bracket 163 is viewed in a direction orthogonal to the rotational axis of the fourth annular rotating member 111. That is, a third virtual horizontal face HF3 passing through the upper end of the support bracket 163 and a fourth virtual horizontal face HF4 passing through the lower end of the support bracket 163 are set so that they transect the fourth annular rotating member 111.

Furthermore, the linking means 164 is set at a position where at least part thereof overlaps the fourth annular rotating member 111 in plan view, and in this embodiment the entirety of the linking means 164 is covered by the eighth collar portion 111c of the fourth annular rotating member 111 from above.

In accordance with the eighth embodiment, since the fourth base member 108, which can move along the slide rail 13 while rotatably supporting the fourth annular rotating member 111 supporting the seat frame 12 of the seat 11, is disposed further inside than the middle part in the width direction of the pair of slide rails 13 in plan view, it is possible to reduce the size of the fourth base member 108, and consequently the size of the fourth seat-rotating device 109.

Furthermore, since the slide rail 13 is formed from the fixed rail 121 and the movable rail 126 slidably fitted to the fixed rail 121, the fourth base member 108 is linked, via the linking means 164, to the support bracket 163 connectedly provided on the movable rail 126 so as to extend to the inside of the pair of slide rails 13 and formed integrally with or separately from the movable rail 126 (separately in this embodiment), the deformation-suppressing mechanism 169 suppressing upward lifting of the fourth annular rotating member 111 with respect to the movable rail 126 is formed from the first hook member 167, which is fixed onto the movable rail 126 or the support bracket 163, and the second hook member 168, which is fixed to the fourth annular rotating member 111 and is engaged with the first hook member 167 while allowing the fourth annular rotating member 111 to rotate, and the first hook member 167 is disposed at a position where overlapping the linking means 164 in plan view is avoided, it is possible to avoid mutual interference between the linking means 164 and the deformation-suppressing mechanism 169.

Moreover, since the linking means 164 is disposed at a lower position in the vertical direction than the deformation-suppressing mechanism 169, due to the linking means 164 being present at a position where interference with the deformation-suppressing mechanism 169 is avoided it is possible to prevent the fourth seat-rotating device 109 from increasing in height.

Furthermore, since the linking means 164 is disposed at a position adjacent to the pair of slide rails 13 from the inside in a direction in which the slide rails 13 are arranged side by side, it is possible to decrease the height of the fourth seat-rotating device 109.

Moreover, since the annular rotation support part 116 provided on the fourth base member 108 so as to rotatably support the fourth annular rotating member 111 is disposed between the pair of slide rails 13 in plan view, and the position in plan view of the linking means 164 disposed on at least one side (both the front and rear sides in this embodiment) of the third virtual vertical face VF3 passing through the center of the rotation support part 116 and orthogonal to the pair of slide rails 13 is set so as to be present between the slide rail 13 and the fourth annular rotating member 111 and rotation support part 116 on the first to fourth imaginary straight lines L1 to L4 passing through the central parts of the fourth annular rotating member 111 and the rotation support part 116 and the central part of the linking means 164, it is possible to dispose the linking means 164 by utilizing effectively a space between the slide rail 13 and the fourth annular rotating member 111 and annular rotation support part 116.

Furthermore, since the vertical position of the support bracket 163 is set so that it overlaps part of the fourth annular rotating member 111 when the support bracket 163 is viewed in a direction orthogonal to the rotational axis of the fourth annular rotating member 111, it is possible to avoid any increase in the vertical dimension of the fourth seat-rotating device 109 due to the disposition of the support bracket 163.

Moreover, since at least part of the linking means 164 overlaps the slide rail 13 when viewed from the side in a direction orthogonal to the longitudinal direction the slide rail 13, it is possible to dispose the linking means 164 at a position where mutual interference with the deformation-suppressing mechanism 169 is avoided while avoiding any increase in the vertical dimension of the fourth seat-rotating device 109 due to the disposition of the linking means 164.

Furthermore, since the linking means 164 is disposed at a lower position in the vertical direction than the part, connected to the movable rail 126, of the support bracket 163, which is separate from the movable rail 126, it is possible to suppress upward protrusion of the linking means 164 from the movable rail 126 while utilizing effectively the height of the slide rail 13.

Moreover, since the support bracket 163 has the flat plate-shaped mounting plate portion 163a disposed on the movable rail 126 so that its lower face is fixed to the movable rail 126, the lower end of the first hook member 167 is fixed to the upper face of the mounting plate portion 163a, and the linking means 164 is disposed at a lower position in the vertical direction than the mounting plate portion 163a, it is possible to easily arrange a structure that can avoid mutual interference between the deformation-suppressing mechanism 169 and the linking means 164.

Furthermore, since the linking means 164 is set so that at least part thereof overlaps the fourth annular rotating member 111 when viewed from the side in a direction orthogonal to the longitudinal direction of the slide rail 13, it is possible to suppress any increase in the size of the fourth seat-rotating device 109.

Moreover, since the linking means 164 is set at a position where at least part thereof overlaps the fourth annular rotating member 111 in plan view, it is possible to further reduce the size of the fourth seat-rotating device 109.

Furthermore, since the fixed portion 50, fixed to the movable rail 126, of the mounting plate portion 163a of the support bracket 163 is disposed at a position where it overlaps the first hook member 167 of the deformation-suppressing mechanism 169 in plan view, it is possible for the slide rail 13 to efficiently exhibit a counterforce when a deforming force is applied to the first hook member 167 of the deformation-suppressing mechanism 169.

Moreover, since the seat cushion frame 28 supporting the seat cushion 11a has the pair of side frames 28a, which extend linearly in the fore-and-aft direction so as to be arranged at positions spaced from each other in the left-and-right direction, the pan frame 28b linking front end parts of the side frames 28a, and the rear pipe 28c linking rear end parts of the pair of side frames 28a, the cushion-side pressure-receiving member 99, which receives a load from above the seat cushion 11a, is stretched between the pan frame 28b and the rear pipe 28c, and the fourth base member 108 is disposed on the inside of the pair of side frames 28a beneath the cushion-side pressure-receiving member 99, it is also possible thereby to reduce the size of the fourth base member 108.

Embodiments of the present invention are explained above, but the present invention is not limited to the above embodiments and may be modified in a variety of ways as long as the modifications do not depart from the subject matter thereof.

For example, in the above embodiments the slide rail 13 extends in the vehicle fore-and-aft direction and makes the seat 11 movable in the vehicle fore-and-aft direction, but it may be a slide rail that makes the seat 11 move in the vehicle left-and-right direction.

Furthermore, it is not necessary for the pair of slide rails to have the same shape, and they may have different shapes from each other as long as they extend in parallel with each other.

Moreover, the cushion-side pressure-receiving member is not limited to one having a plurality of seat springs 20 formed by curving a metal wire into a zig-zag so as to snake from left to right, and a plurality of seat springs formed by curving a metal wire in zig-zag so as to snake from front to back may be stretched between left and right side frames.

The invention claimed is:

1. A seat-rotating device for a seat installed in a vehicle, comprising:
    a base member;
    a support bracket linked to the base member;
    a support member fixed to the base member;
    a rotating member rotatably supported on the base member and supporting a seat frame of the seat, a part of the rotating member being positioned between the base member and the support member;
    a first bearing member disposed between the base member and the rotating member;
    a second bearing member disposed between the support member and the rotating member; and
    a deformation-suppressing mechanism provided between the rotating member and the base member and suppressing upward lifting of the rotating member with respect to the base member,
    wherein the support bracket and an outer peripheral of the rotating member are spaced apart by the deformation-suppressing mechanism.

2. The seat-rotating device according to claim 1, wherein the deformation-suppressing mechanism includes a first hook member fixed onto the support bracket, and a second hook member fixed to the rotating member and engaged with the first hook member so as to allow the rotating member to rotate.

3. The seat-rotating device according to claim 1, wherein the support member extends inward and downward in a left-and-right direction.

4. The seat-rotating device according to claim 1, wherein an inner part of the support member is disposed between the second bearing member and the first bearing member.

5. The seat-rotating device according to claim 1, wherein the base member has an annular bottom wall portion and a cylindrical side wall portion that rises upward from an outer peripheral part of the bottom wall portion,
    the first bearing member is in contact with the cylindrical side wall portion.

6. The seat-rotating device according to claim 1, wherein at least a portion of the second bearing member is disposed inside the cylindrical side wall portion in the horizontal direction.

7. The seat-rotating device according to claim 1, wherein the rotating member has a portion disposed inside of the cylindrical sidewall portion in the horizontal direction.

8. The seat-rotating device according to claim 2, wherein the support bracket connectedly provided to slide rails provided on a vehicular floor face, and
    the first hook member is disposed of above the slide rail.

9. The seat-rotating device according to claim 2, wherein the support bracket connectedly provided to the slide rails provided on a vehicular floor face, and the first hook member is disposed inner than an outer end of the slide rail in a horizontal direction.

10. The seat-rotating device according to claim 2, wherein an outer peripheral of the base member is disposed inner than the first hook member in a horizontal direction.

11. The seat-rotating device according to claim 1, wherein the first bearing member is a ball bearing.

12. The seat-rotating device according to claim 1, wherein the second bearing member is a rattle-suppressing member.

13. The seat-rotating device according to claim 1, wherein the support member is joined to the base member via a plurality of rivets.

14. A seat-rotating device for a seat installed in a vehicle, comprising:
    a base member;
    a support member fixed to the base member;
    a rotating member rotatably supported on the base member and supporting a seat frame of the seat, a part of the rotating member being positioned between the base member and the support member;
    a first bearing member disposed between the base member and the rotating member; and
    a second bearing member disposed between the support member and the rotating member,
    wherein viewed from a vertical direction, the first bearing member has an overlap with the second bearing member,
    the base member has a recess recessed downward, and
    an outer edge of the rotating member is received in the recess.

15. The seat-rotating device according to claim 14, wherein the recess is located below the joint surface of the support member and the base member.

16. The seat-rotating device according to claim 14, wherein the outer edge of the rotating member is disposed at a lower position than the edge of the recess and is received in the recess.

17. The seat-rotating device according to claim 14, wherein the recess and the support member form a covering member, covering the circumferential edge of the rotating member.

18. The seat-rotating device according to claim 14, wherein the base member is supported by a pair of slide rails provided on a vehicular floor face, and the recess is disposed at a lower position than the lower edge of the slide rail.

19. The seat-rotating device according to claim 14, wherein the first bearing member is in contact with the flat portion of the base member.

20. The seat-rotating device according to claim 14, wherein the base member is supported by a pair of slide rails provided on a vehicular floor face,
    each of the slide rails is formed from a fixed rail and a movable rail that is slidably fitted to the fixed rail, and
    the overlap of the first bearing member is disposed at a lower position than the upper edge of the fixed rail and is disposed at an upper position than the lower edge of the fixed rail.

21. The seat-rotating device according to claim 14, wherein the base member is supported by a pair of slide rails provided on a vehicular floor face, and
    the overlap of the first bearing member is disposed at a lower position than the upper edge of the slide rail and is disposed at an upper position than the lower edge of the slide rail.

22. A seat-rotating device for a seat installed in a vehicle, comprising:
- a base member supported by a pair of slide rails provided on a vehicular floor face;
- a support member fixed to the base member;
- a rotating member rotatably supported on the base member and supporting a seat frame of the seat, a part of the rotating member being positioned between the base member and the support member;
- a first bearing member disposed between the base member and the rotating member;
- a second bearing member disposed between the support member and the rotating member;
- a support bracket linked to the base member;
- a first hook member fixed onto the support bracket; and
- a second hook member fixed to the rotating member and engaged with the first hook member so as to allow the rotating member to rotate,
- wherein each of the slide rails is formed from a fixed rail and a movable rail that is slidably fitted to the fixed rail,
- the support bracket is connectedly provided to the movable rails,
- the support bracket and an outer peripheral of the rotating member are spaced apart by the first hook member and by the second hook member, and the support bracket is positioned between the pair of slide rails in a left-and-right direction.

23. A seat-rotating device for a seat installed in a vehicle, comprising:
- a base member supported by a pair of slide rails provided on a vehicular floor face;
- a support member fixed to the base member;
- a rotating member rotatably supported on the base member and supporting a seat frame of the seat, a part of the rotating member being positioned between the base member and the support member;
- a first bearing member disposed between the base member and the rotating member;
- a second bearing member disposed between the support member and the rotating member;
- a support bracket linked to the base member;
- a first hook member fixed onto the support bracket; and
- a second hook member fixed to the rotating member and engaged with the first hook member so as to allow the rotating member to rotate,
- wherein each of the slide rails is formed from a fixed rail and a movable rail that is slidably fitted to the fixed rail,
- the support bracket is connectedly provided to the movable rails,
- the support bracket and an outer peripheral of the rotating member are spaced apart by the first hook member and the second hook member,
- the first hook member extends upward from the support bracket,
- the second hook member extends downward from the rotating member, and
- the second hook member is positioned more outward than the first hook member in a left-and-right direction.

24. A seat-rotating device for a seat installed in a vehicle, comprising:
- a base member supported by a pair of slide rails provided on a vehicular floor face;
- a support member fixed to the base member;
- a rotating member rotatably supported on the base member and supporting a seat frame of the seat, a part of the rotating member being positioned between the base member and the support member;
- a first bearing member disposed between the base member and the rotating member;
- a second bearing member disposed between the support member and the rotating member;
- a support bracket linked to the base member;
- a first hook member fixed onto the support bracket; and
- a second hook member fixed to the rotating member and engaged with the first hook member so as to allow the rotating member to rotate,
- wherein each of the slide rails is formed from a fixed rail and a movable rail that is slidably fitted to the fixed rail,
- the support bracket is connectedly provided to the movable rails,
- the support bracket and an outer peripheral of the rotating member are spaced apart by the first hook member and by the second hook member, and
- viewed from a vertical direction, the first hook member overlaps the second hook member and the slide rail.

25. A seat-rotating device for a seat installed in a vehicle, comprising:
- a base member supported by a pair of slide rails provided on a vehicular floor face;
- a support member fixed to the base member;
- a rotating member rotatably supported on the base member and supporting a seat frame of the seat, a part of the rotating member being positioned between the base member and the support member;
- a first bearing member disposed between the base member and the rotating member;
- a second bearing member disposed between the support member and the rotating member;
- a support bracket linked to the base member;
- a first hook member fixed onto the support bracket; and
- a second hook member fixed to the rotating member and engaged with the first hook member so as to allow the rotating member to rotate,
- wherein each of the slide rails is formed from a fixed rail and a movable rail that is slidably fitted to the fixed rail,
- the support bracket is connectedly provided to the movable rails,
- the support bracket and an outer peripheral of the rotating member are spaced apart by the first hook member and the second hook member,
- the support bracket is positioned between the pair of slide rails in a left-and-right direction,
- the first hook member extends upward from the support bracket,
- the second hook member extends downward from the rotating member,
- the second hook member is positioned more outward than the first hook member in a left-and-right direction, and
- viewed from a vertical direction, the first hook member overlaps the second hook member and the slide rail.

26. A method for making a seat-rotating device for a seat installed in a vehicle, comprising:
- providing a deformation-suppressing mechanism to a rotating member and a support bracket;
- linking the support bracket to a base member;
- arranging a rotating member on the base member via a first bearing member,
- arranging a support member to contact the rotating member via a second bearing member; and
- fixing the support member to the base member,
- wherein the support bracket and an outer peripheral of the rotating member are spaced apart by the deformation-suppressing mechanism.

27. The method according to claim 26, further comprises:
fixing a first hook member onto the support bracket;
- fixing a second hook member to the rotating member and engaging the second hook member with the first hook member so as to allow the rotating member to rotate;
- connectedly providing the support bracket to slide rails provided on a vehicular floor face,
- wherein the support bracket and an outer peripheral of the rotating member are spaced apart by the first hook member and the second hook member,
- the first hook member is positioned inner than an outer end of the slide rail in a horizontal direction,
- each of the slide rails is formed from a fixed rail and a movable rail that is slidably fitted to the fixed rail,
- the support bracket is connectedly provided to the movable rails, and
- the linking portion of the support bracket and the base member is located below the first hook member and below a fixed portion of the support bracket that is fixed to the movable rail.

\* \* \* \* \*